United States Patent
Chen

(10) Patent No.: US 11,379,685 B2
(45) Date of Patent: Jul. 5, 2022

(54) MACHINE LEARNING CLASSIFICATION SYSTEM

(71) Applicant: SAS Institute Inc., Cary, NC (US)

(72) Inventor: Xu Chen, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/386,706

(22) Filed: Jul. 28, 2021

(65) Prior Publication Data

US 2021/0357680 A1 Nov. 18, 2021

Related U.S. Application Data

(63) Continuation-in-part of application No. 17/224,708, filed on Apr. 7, 2021, now Pat. No. 11,087,215, which is a continuation-in-part of application No. 17/178,798, filed on Feb. 18, 2021, now Pat. No. 11,151,463, which is a continuation-in-part of application No. 17/093,917, filed on Nov. 10, 2020, now Pat. No. 11,010,691, and a continuation-in-part of application No. 16/904,818, filed on Jun. 18, 2020, now Pat. No. 10,956,825.

(Continued)

(51) Int. Cl.
*G06K 9/62* (2022.01)
*G06N 3/08* (2006.01)

(52) U.S. Cl.
CPC ......... *G06K 9/6223* (2013.01); *G06K 9/6259* (2013.01); *G06N 3/08* (2013.01)

(58) Field of Classification Search
CPC ...... G06K 9/6223; G06K 9/6259; G06N 3/08; G06N 3/0454; G06N 3/0472; G06V 10/7753; G06V 10/82
See application file for complete search history.

(56) References Cited

U.S. PATENT DOCUMENTS 10,929,762 B1   2/2021   Chen et al.
11,087,215 B1   8/2021   Chen
(Continued)

OTHER PUBLICATIONS

Prince, Tutorial #5: Variational Autoencoders, Borealis AI, https://www.borealisai.com/en/blog/tutorial-5-variational-auto-encoders/ (Jan. 28, 2020). (Year: 2020).*

(Continued)

*Primary Examiner* — Kamran Afshar
*Assistant Examiner* — Ryan C Vaughn
(74) *Attorney, Agent, or Firm* — Bell & Manning, LLC

(57) ABSTRACT

A computing device classifies unclassified observations. A first batch of unclassified observation vectors and a first batch of classified observation vectors are selected. A prior regularization error value and a decoder reconstruction error value are computed. A first batch of noise observation vectors is generated. An evidence lower bound (ELBO) value is computed. A gradient of an encoder neural network model is computed, and the ELBO value is updated. A decoder neural network model and an encoder neural network model are updated. The decoder neural network model is trained. The target variable value is determined for each observation vector of the unclassified observation vectors based on an output of the trained decoder neural network model. The target variable value is output.

30 Claims, 11 Drawing Sheets
(1 of 11 Drawing Sheet(s) Filed in Color)

Related U.S. Application Data

(60) Provisional application No. 63/164,026, filed on Mar. 22, 2021, provisional application No. 63/086,401, filed on Oct. 1, 2020, provisional application No. 63/060,649, filed on Aug. 3, 2020, provisional application No. 63/056,877, filed on Jul. 27, 2020, provisional application No. 63/056,595, filed on Jul. 25, 2020, provisional application No. 63/049,473, filed on Jul. 8, 2020, provisional application No. 62/991,973, filed on Mar. 19, 2020, provisional application No. 62/990,399, filed on Mar. 16, 2020.

(56) References Cited

U.S. PATENT DOCUMENTS

| | | | |
|---|---|---|---|
| 2019/0205794 A1* | 7/2019 | Hsu | G06N 5/022 |
| 2021/0316455 A1* | 10/2021 | Bingham | B25J 9/1669 |

OTHER PUBLICATIONS

Zhang et al., "Semi-Supervised Learning of Bearing Anomaly Detection via Deep Variational Autoencoders," in arXiv preprint arXiv: 1912.01096 (2019). (Year: 2019).*

Zhu et al., "Robust Graph Dimensionality Reduction," Proceedings of the Twenty-Seventh International Joint Conference on Artificial Intelligence IJCA 18, pp. 3257-3263, Jul. 13, 2018.

Adeli et al., "Semi-Supervised Discriminative Classification Robust to Sample Outliers and Feature-Noises," *IEEE Trans Pattern Anal Mach Intll.*, Feb. 2019.

Patrini et al., Making Deep Neural Networks Robust to Label Noise: a Loss Correction Approach, [stat.ML], Sep. 2016, oral paper at CVPR2017.

Maaløe, L., Sønderby, C. K., Sønderby, S. K., and Winther, O. "Auxiliary Deep Generative Models," International Conference on Machine Learning, 2017.

Miyato, T., Maeda, S.-i. M. K., Nakae, K., and Ishii, S. "Distributional Smoothing with Virtual Adversarial Training," arXiv preprint arXiv:1507.00677, ICLR 2016.

Li, J., Socher, R., and Hoi, S. "DIVIDEMIX: Learning with noisy labels as semi-supervised learning." International Conference on Learning Representation, ICLR 2020.

Futami, F., Sato, I., and Sugiyama, M. "Variational Inference based on Robust Divergences" Twenty-First International Conference on Artificial Intelligence and Statistics, 2018.

Murphy, K. Conjugate Bayesian analysis of the Gaussian distribution. Lecture notes on UC Berkeley, 2007.

Kingma, D. and Welling, M. "AutoEncoding Variational Bayes" arXiv preprint arXiv:1312.6114, 2013.

Bishop, C. Pattern Recognition and Machine Learning. Springer, 2006. Chapter 10.

Hambel et al. Robust Statistics. M.Sc. in Applied Statistics MT 2004 Wiley Series in Probability and Statistics, 1992-2004 B.D. Ripley.

* cited by examiner

| Dataset | WebVision | | ILSVRC12 | |
|---|---|---|---|---|
| Metric | top1 | top5 | top1 | top5 |
| Coteaching | 62.75 | 83.61 | 60.73 | 83.56 |
| F-correct | 60.73 | 81.64 | 56.81 | 81.72 |
| Decoupling | 61.37 | 82.95 | 57.93 | 81.38 |
| MentorNet | 62.78 | 80.92 | 57.52 | 79.51 |
| Iterative-CV | 64.87 | 84.03 | 61.31 | 83.79 |
| Dividemix | 75.68 | 87.73 | 72.87 | 85.61 |
| RGAN | 74.39 | 85.68 | 71.35 | 84.78 |
| URSVAE | 77.35 | 90.68 | 75.41 | 90.68 |

FIG. 9

MACHINE LEARNING CLASSIFICATION SYSTEM

CROSS-REFERENCE TO RELATED APPLICATIONS

The present application claims the benefit of and priority under 35 U.S.C. § 119(e) to U.S. Provisional Patent Application No. 63/164,026 filed on Mar. 22, 2021. The present application is also a continuation-in-part of U.S. patent application Ser. No. 17/178,798 that was filed Feb. 18, 2021, the entire contents of which are hereby incorporated by reference. The present application is also a continuation-in-part of U.S. patent application Ser. No. 17/224,708 that was filed Apr. 7, 2021, the entire contents of which are hereby incorporated by reference.

U.S. patent application Ser. No. 17/178,798 claims the benefit of and priority based on 35 U.S.C. § 119(e) to U.S. Provisional Patent Application No. 63/086,401 filed Oct. 1, 2020, to U.S. Provisional Patent Application No. 63/049,473 filed Jul. 8, 2020, to U.S. Provisional Patent Application No. 62/991,973 filed Mar. 19, 2020, and to U.S. Provisional Patent Application No. 62/990,399 filed Mar. 16, 2020, the entire contents of which are hereby incorporated by reference.

U.S. patent application Ser. No. 17/178,798 claims the benefit of and priority as a continuation-in-part of U.S. patent application Ser. No. 17/093,917 that was filed Nov. 10, 2020 and issued May 18, 2021 as U.S. Pat. No. 11,010,691, the entire contents of which are hereby incorporated by reference. U.S. patent application Ser. No. 17/093,917 claims the benefit of and priority based on 35 U.S.C. § 119(e) to U.S. Provisional Patent Application No. 63/049,473 filed Jul. 8, 2020, to U.S. Provisional Patent Application No. 62/991,973 filed Mar. 19, 2020, and to U.S. Provisional Patent Application No. 62/990,399 filed Mar. 16, 2020.

U.S. patent application Ser. No. 17/178,798 claims the benefit of and priority as a continuation-in-part of U.S. patent application Ser. No. 16/904,818 that was filed Jun. 18, 2020 and issued Mar. 23, 2021 as U.S. Pat. No. 10,956,825, the entire contents of which are hereby incorporated by reference. U.S. patent application Ser. No. 16/904,818 claims the benefit of and priority based on 35 U.S.C. § 119(e) to U.S. Provisional Patent Application No. 62/991,973 filed Mar. 19, 2020 and to U.S. Provisional Patent Application No. 62/990,399 filed Mar. 16, 2020.

U.S. patent application Ser. No. 17/224,708 claims the benefit of and priority under 35 U.S.C. § 119(e) to U.S. Provisional Patent Application No. 63/060,649 filed on Aug. 3, 2020, to U.S. Provisional Patent Application No. 63/056,877 filed on Jul. 27, 2020, and to U.S. Provisional Patent Application No. 63/056,595 filed on Jul. 25, 2020, the entire contents of which are hereby incorporated by reference.

BACKGROUND

Machine learning defines models that can be used to predict occurrence of an event, for example, from sensor or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be labeled to indicate occurrence or non-occurrence of the event or to recognize/classify the object. An unsupervised learning system predicts the label or class, target variable y, by defining a model that describes the hidden structure in the training data.

Supervised learning requires that the target (dependent) variable y be labeled so that a model can be built to predict the label of new unlabeled data. A supervised learning system discards observations in training data that are not labeled. While supervised learning algorithms are typically better predictors/classifiers, labeling training data often requires a physical experiment or a statistical trial, and human labor is usually required. As a result, it may be very complex and expensive to fully label an entire training dataset.

A semi-supervised learning system only requires that the target (dependent) variable y be labeled in a small portion of the training data to classify the unlabeled training data in the training dataset. Semi-supervised learning systems have many application areas such as image analysis tasks and microarray gene expression classification where measurements require expensive machinery and labels take significant time-consuming analysis and human effort.

Training deep neural networks heavily relies on the collection of large datasets of high-quality labels. Semi-supervised deep neural networks alleviate the challenges of labeling large datasets. However, existing semi-supervised deep neural networks inevitably introduce label noise due to the subjective nature of manual classification, human fatigue, and the difficulty of the classification task. As a result, class labels obtained from various sources such as crowdsourcing, synthetic labeling, data programming, and manual classification inevitably contain noise. Moreover, the problem of semi-supervised deep learning with noisy labels becomes more complicated when the input data also contain outliers such that the behavior of the outlier observations is far away from typical observations. For example, outlier observations may occur due to patient movement during an imaging process. A performance of existing semi-supervised deep neural networks can degrade significantly in the presence of noisy labels (incorrectly classified observations) and outlier observations.

SUMMARY

In an example embodiment, a non-transitory computer-readable medium is provided having stored thereon computer-readable instructions that, when executed by a computing device, cause the computing device to predict occurrence of an event or classify an object using semi-supervised data to label unclassified data. (A) A first batch of unclassified observation vectors is selected from a plurality of unclassified observation vectors. The first batch of unclassified observation vectors includes a predefined number of observation vectors. (B) A first batch of classified observation vectors is selected from a plurality of classified observation vectors. A target variable value is defined to represent a class for each respective observation vector of the plurality of classified observation vectors. The first batch of classified observation vectors includes the predefined number of observation vectors. (C) A prior regularization error value is computed using a β-divergence distance computation. (D) A decoder reconstruction error value is computed. (E) A first batch of noise observation vectors is generated using a predefined noise function. The first batch of noise observation vectors includes a predefined number of observation vectors. (F) An evidence lower bound (ELBO) value is computed from the computed prior regularization error value and the computed decoder reconstruction error value. (G) A gradient of an encoder neural network model is computed. (H) The ELBO value is updated. (I) A decoder neural network model is updated with a plurality of observation vectors. The plurality of observation vectors includes the first batch of unclassified observation vectors, the first batch of classified observation vectors, and the first batch of noise observation vectors. (J) The encoder neural network model is updated with the plurality of observation vectors. (K) The decoder neural network model is trained to classify the plurality of unclassified observation vectors and the first batch of noise observation vectors by repeating (A) to (J) until the computed ELBO value indicates a decoder loss value and an encoder loss value have converged or a predetermined maximum number of iterations of (A) is performed. The target variable value is determined for each observation vector of the plurality of unclassified observation vectors based on an output of the trained decoder neural network model. The target variable value is output for each observation vector of the plurality of unclassified observation vectors. The target variable value selected for each observation vector of the plurality of unclassified observation vectors identifies the class of a respective observation vector.

In yet another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to predict occurrence of an event or classify an object using semi-supervised data to label unclassified data.

In an example embodiment, a method of predicting occurrence of an event or classifying an object using semi-supervised data to label unclassified data is provided.

Other principal features of the disclosed subject matter will become apparent to those skilled in the art upon review of the following drawings, the detailed description, and the appended claims. As used in this specification, the term "data" is intended to encompass both a single datum and a group of data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 9 shows a second accuracy comparison using two additional datasets between existing classification methods and the classification model trained using the classification application of FIGS. 2A through 2C in accordance with an illustrative embodiment.

DETAILED DESCRIPTION

A classification application 122 more accurately classifies unclassified observation vectors using a relatively small number of classified observation vectors that may be noisy, which indicates that some of the human classified observation vectors have been classified incorrectly. Existing classification methods are not designed to work effectively when some of the classified observation vectors have been classified incorrectly, and thus, exhibit performance degradations in the presence of noisy classifications. Existing classification methods further are not designed to work effectively when some of the classified observation vectors are outliers with respect to the other observations. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image resulting in an incorrect classification of the image as non-cancerous. As another example, it is often challenging to distinguish images such as an image including a wolf versus a dog, such as a German shepherd.

Classification application 122 provides a noise-robust semi-supervised learning method based on a deep generative model by jointly tackling noisy labels and outliers simultaneously. Classification application 122 may be referred to as a unified robust semi-supervised variational autoencoder (URSVAE). An uncertainty of input data is characterized by placing an uncertainty prior on the parameters of probability density distributions to ensure a robustness of the variational encoder towards outliers. A noise transition model is integrated into classification application 122 to alleviate the detrimental effects of noisy labels. Moreover, a robust divergence measure is employed to further enhance the robustness, where a new variational lower bound is optimized to infer the network parameters based on use of the robust divergence measure.

There are applications for classification application 122 in many areas such as process control and equipment health monitoring, image processing and classification, data segmentation, data analysis, etc. The results presented herein further demonstrate the improved accuracy in classification combined with a typically much faster computation time.

Figure 1:
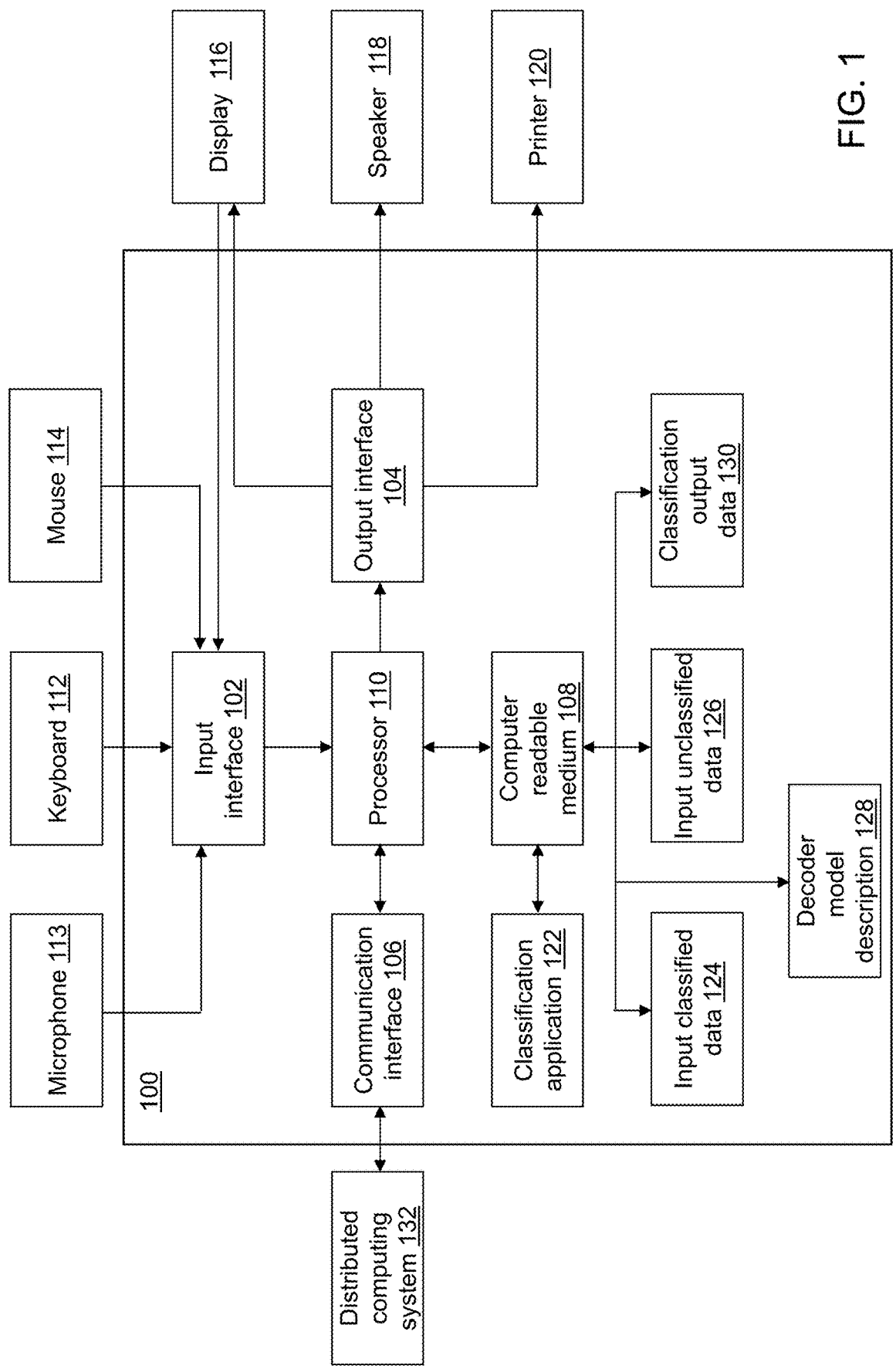
FIG. 1 depicts a block diagram of a classification device in accordance with an illustrative embodiment.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, a decoder model description 128, and classification output data 130. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116.

The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth® antenna, a telephone jack, a USB port, etc. Data and/or messages may be transferred between classification device 100 and another computing device of a distributed computing system 132 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprising computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transfer protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables defines a vector $x_i$ for each observation vector i=1, 2, . . . , N, where N is a number of the observation vectors included in input classified data 124 and input unclassified data 126.

Input classified data 124 includes a target variable value $y_i$ for each observation vector that indicates a label or class or other characteristic defined for the respective observation vector $x_i$ for i=1, 2, . . . , $N_c$, where $N_c$ is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, the target variable value $y_i$ may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. For example, input unclassified data 126 includes the respective observation vector $x_i$ for i=1, 2, . . . , $N_U$, where $N_U$ is a number of the observation vectors included in input unclassified data 126.

Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefore, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relates.

In data science, engineering, and statistical applications, data often consists of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 132 and accessed by classification device 100 using communication interface 106 and/or input interface 102. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 132. Classification device 100 may coordinate access to input classified data 124 and input unclassified data 126 that is distributed across distributed computing system 132 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2A:
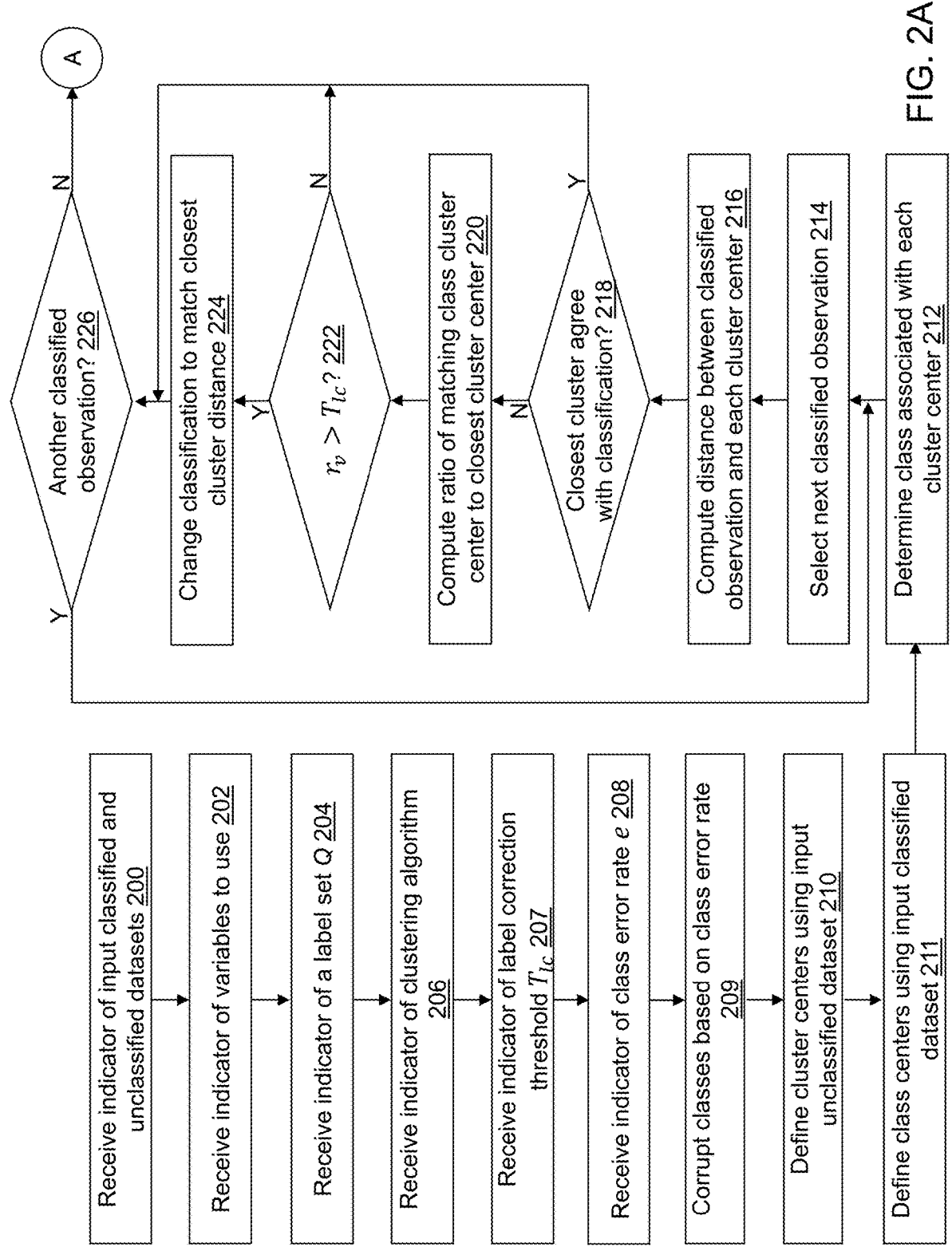
FIGS. 2A through 2C depict a flow diagram illustrating examples of operations performed by a classification application of the classification device of FIG. 1 in accordance with an illustrative embodiment.
Figure 2B:
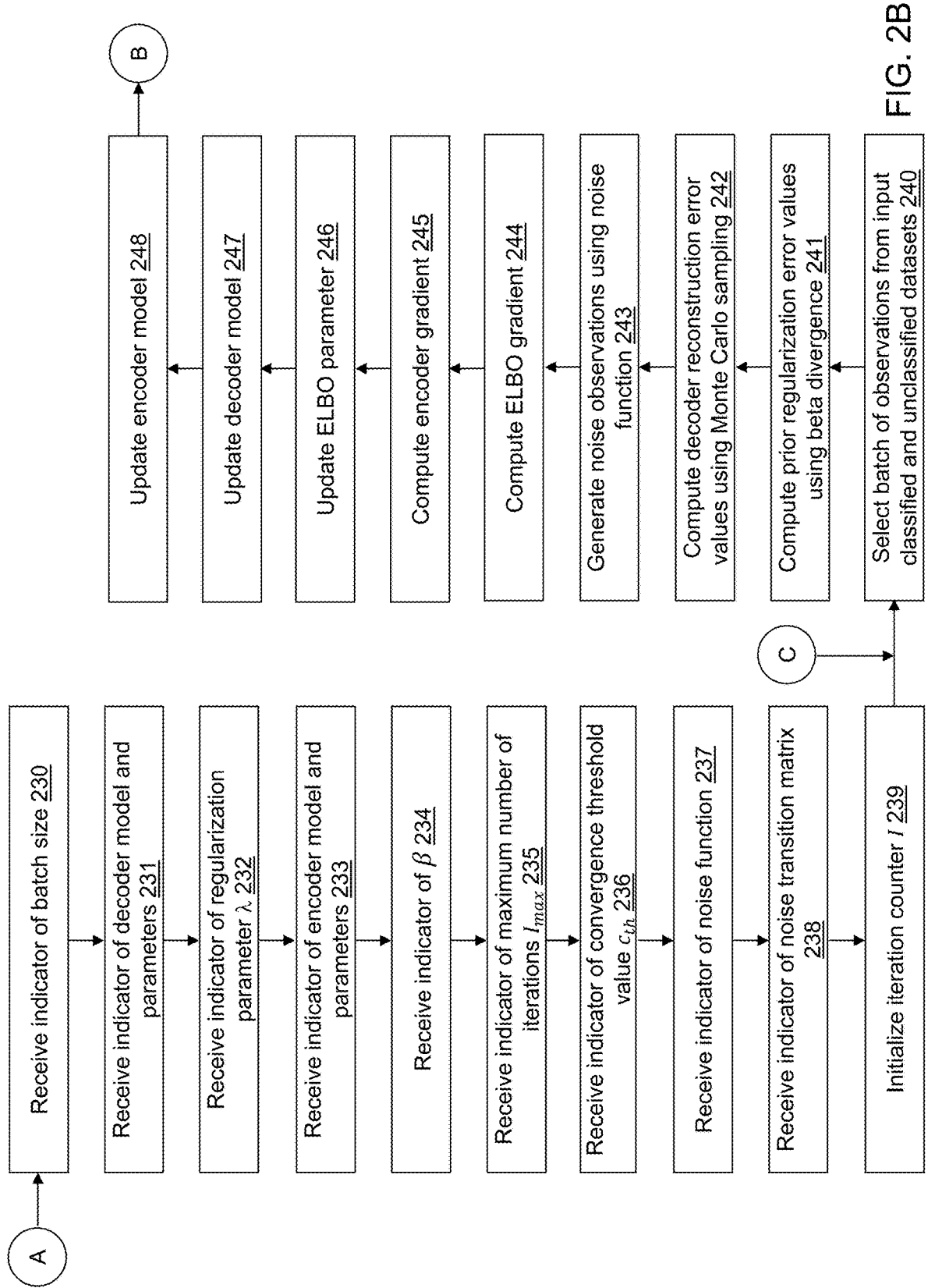
Figure 2C:
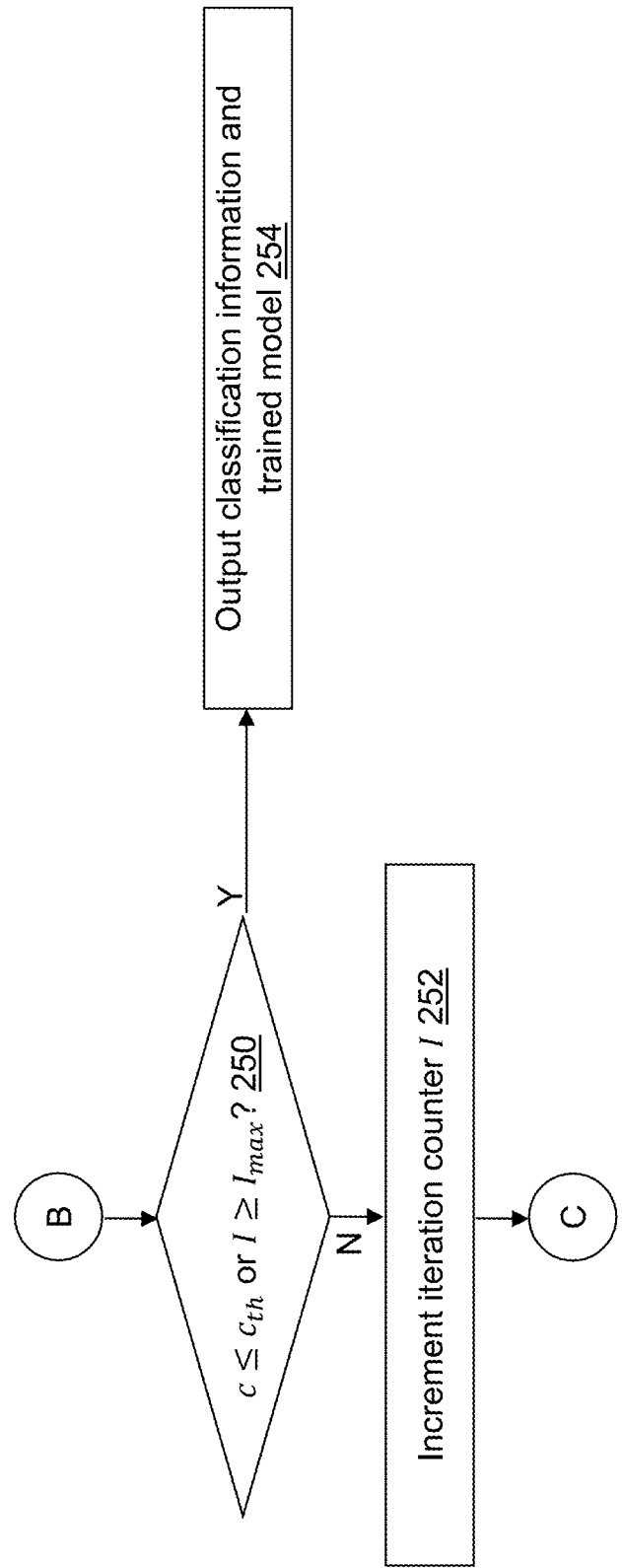

Referring to FIGS. 2A through 2C, example operations associated with classification application 122 are described. Additional, fewer, or different operations may be performed depending on the embodiment of classification application 122. The order of presentation of the operations of FIGS. 2A through 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122. Some of the operational flows further may be performed in parallel, for example, using a plurality of threads and/or a plurality of computing devices such as may be included in distributed computing system 132.

Typically, variational inference with deep learning from powerful probabilistic models are constructed by an inference neural network $q(z|x)$ and a generative neural network $p(x|z)$. The generative model and the inference model are parameterized by $\theta$ and $\phi$, respectively. Subsequently, the network parameters are estimated by optimizing the evidence lower bound (ELBO) in the variational inference.

Classification application 122 characterizes the uncertainties of the input data with Gaussian mixture models in light of outliers, fits the input data using a $\beta$-divergence, and incorporates a noise transition model for noisy labels with the $\beta$-divergence to jointly counter compound noise. Classification application 122 places uncertainty priors on the first and second order statistics of the Gaussian mixture models and computes the ELBO based on the $\beta$-divergence used for data fitting to infer the network parameters.

More specifically, classification application 122 integrates the uncertainty model by modeling the input data X with a Gaussian mixture model and placing the uncertainty prior on the parameters of the mixture components. A number of mixture components K is determined from a number of classes in classified data 124, where K also refers to the number of classes. Specifically, $x_n$ is a noisy measurement of a true position and is a draw from the Gaussian mixture model, where a mean $T_k$ of each Gaussian component is unknown and a variance $C_k$ of each Gaussian component is known. To characterize the uncertainty and the outliers from the input data, the Gaussian prior is placed on top of the mean for each Gaussian component. Namely, $T_k$ satisfies a normal distribution with a mean $\mu_k$ and a precision matrix $\Lambda_k$. $\omega_i$ is a latent variable for an $i^{th}$ observation specifying which Gaussian component the observation came from and $\pi$ is a mixing weight for the Gaussian mixture model. Specifically, a Normal-Wishart prior is placed on the mean $\mu_k$ and the precision matrix $\Lambda_k$ of the Gaussian components: $p(\mu, \Lambda) = \Pi_{k=1}^{K} N(\mu_k|m_0, (\beta_0 \Lambda_k)^{-1}) W(\Lambda_k|W_0, v_0)$, where $m_0$ is set to be zero and $\beta_0$ is set to be a very small value. $W(\Lambda|W, v)$ is a Wishart distribution with scale matrix W and v degrees of freedom.

For a semi-supervised learning setting, the target variable values y are either unknown (unclassified data 126) or noisy (classified data 124). The generative model is defined as: $p_\theta(x|\omega, T, C) p_\theta(T|Z, \mu, \Lambda) p_\theta(a|z, \tilde{y}, x) p_\theta(x|\tilde{y}, z) p(z) p(\tilde{y}) p(\omega)$, where $p_\theta$ indicates a deep neural network with parameters $\theta$ and y as a ground truth of a class label (target variable value $y_i$). For unclassified data 126, y is considered a latent variable. Cat(.) indicates a multinomial distribution and the target variable values y are assumed to have a categorical distribution though other distributions may be used for the latent variable y for unclassified observations. To fit more complicated posteriors for the marginal distribution $p(z|x)$, the variational distribution can be extended with auxiliary variables a, so that the generative model is invariant to marginalization over a. Based on this the generative model can be defined as: $p(x, z, a, \omega, T, C, \mu, \Lambda) = p_\theta(x|\omega, T, C) p_\theta(T|Z, \mu, \Lambda) p_\theta(a|z, x) p_\theta(x, z)$. $\theta$ is referred to as $\theta_{enc}$ below and indicates encoder neural network model parameters such as weights.

To mitigate the influence of noisy labels, $\tilde{y}$ indicates the noisy or corrupted classifications, and $\hat{y}$ indicates corrected classifications not observed during the training that is connected with a K×K noise transition matrix M, where $M = (M_{i,j}) \in [0,1]^{K \times K} (\Sigma_i M_{i,j} = 1)$. The generative model can then be expressed as:

$p(z) = N(z|0, I),$ $p(\tilde{y}) = \text{Cat}(\tilde{y}|\eta),$ $p_\theta(a|z, \tilde{y}, x) = f(a; z, \tilde{y}, x),$ $p_\theta(x|z, \tilde{y}) = f(x; z, \tilde{y}, \theta),$ $p(x|\omega, T, C) = \Pi_{n=1}^{NU} \Pi_{k=1}^{K} \pi_k^{\omega nk} N(x_n|t_k, C_k)^{\omega nk} \Pi_{n=1}^{NC} N(t_n|t_{\tilde{y}_n}, C_{\tilde{y}_n}),$ $p(T_k|\mu_k, \gamma_k) = N(t_k|\mu_k, \Lambda_k^{-1}),$ $p(\omega|\pi) = \Pi_{n=1}^{NU} \Pi_{k=1}^{K} \pi_k^{\omega nk},$ $p(\hat{y} = 1|\tilde{y} = j) = M_{i,j}.$ The inference model can be expressed as:

$q_\phi(a, z, \mu, \Lambda, T, \tilde{y}, \omega|x) = q(z|a, \tilde{y}, x) q(a|x) q(\tilde{y}|a, x) q(T, \mu, \Lambda, \omega|x),$ which can be factorized as:

$q_\phi(z|a, \tilde{y}, x) = N(z|\mu_\phi(a, \tilde{y}, x), \text{diag}(\sigma^2)),$ $q_\phi(\tilde{y}|a, x) = \text{Cat}(\tilde{y}|\eta_\phi(a, x)),$ $q_\phi(\mu_k, \Lambda_k) = q(\mu_k|\Lambda_k) q(\Lambda_k).$ $q(T, \mu, \Lambda, \omega|x)$ may be computed, for example, using a mean-field approximation defined as $q(T, \mu, \Lambda, \omega | x) \approx$ $q(T|\omega, x) q(\omega|x) q(\mu, \Lambda|x) = \left[\prod_i \text{Cat}(\omega_i|r_i)\right][\text{Dir}(\pi|\alpha)$ $\prod_k N(\mu_k|m_k, (\beta_k \Lambda_k)^{-1}) W(\Lambda_k|W_k, v_k)]$ to factorize all of the latent variables and parameters. To characterize the normal distributions of $p_\theta(a|z, \tilde{y}, x), p_\theta(x|z, \tilde{y})$, and $q_\phi(z|a, \tilde{y}, x)$, two separate outputs from a top deterministic layer in each deep neural network are defined as $\mu_{\phi, \theta}(.)$ and $\log \sigma_{\phi, \theta}^2(.)$. $\phi$ is referred to as $\theta_{dec}$ below and indicates decoder neural network model parameters such as weights.

A set of latent variables H can be defined as H={a, z, $\mu$, $\Lambda$, T, $\omega$}. A $\beta$-ELBO for classified data 124 can be represented by:

$$L_\beta = \int q(H|x, \tilde{y})$$

$$\left(-\frac{\beta+1}{\beta} \sum_{i=1}^{N} p(\tilde{y}_i|H; x_i)^\beta + N \int \sum_{i=1}^{N} p(\tilde{y}|H; x)^{1+\beta} d\tilde{y}\right) +$$

$$D_\beta[q(H|x, \tilde{y}), p(H)]$$

The equation above computes a lower bound and learns the network parameters from noisy labels and outliers based on classified data 124, where a first term enhances a robustness to the outliers as the reconstruction error relying on the $\beta$-divergence for classified data, and the second term regularizes $q(H|x, \tilde{y})$ to be close to the prior $p(H)$ as the prior regularization error. $L_\beta = L_\beta^{Dec} + L_{prior}$, where $L_\beta^{Dec}$ denotes the reconstruction error from a decoder based on a log likelihood for classified data 124, and $L_{prior}$ denotes the prior regularization error for classified data 124.

To remedy the influence of noisy labels $\tilde{y}$, the ELBO is based on the corrected label $\hat{y}$ using the noise transition model M:

$$q(H|x, \tilde{y}) = \frac{\sum_{\hat{y}^r} p(\tilde{y} = \tilde{y}^r | \hat{y} = \hat{y}^r) q(\hat{y}|H, x) q(H|x)}{\sum_{\hat{y}^r} p(\tilde{y} = \tilde{y}^r | \hat{y} = \hat{y}^r) q(\hat{y}|x)},$$

$$q(\tilde{y}|H, x) = \frac{\sum_{\hat{y}^r} M_{\tilde{y}^r, \hat{y}^r} q(\hat{y}|H, x) q(H|x)}{\sum_{\hat{y}^r} M_{\tilde{y}^r, \hat{y}^r} q(\hat{y}|x)}.$$

For unclassified data 126, by introducing the variational distribution for $\tilde{y}$ as $q_\phi(a, x|\tilde{y})$, the variational lower bound can be represented as $$U_\beta = \int q(H_u|x) \left(-\frac{\beta+1}{\beta} \sum_{i=1}^{N} p(x_i|H_u)^\beta + \int p(x_i|H_u)^{1+\beta} dx\right) +$$

$$D_\beta[q(H_u|x), p(H_u)],$$

where $H_U = \{a, z, y, \mu, \Lambda, T, \omega\}$ is an augmented latent variable set. $U_\beta = U_\beta^{Dec} + U_{prior}$, where $U_\beta^{Dec}$ denotes the reconstruction error from the decoder based on log likelihood for unclassified data 126, and $U_{prior}$ denotes the prior regularization error for unclassified data 126. The full objective function is $L=L_\beta+\lambda U_\beta=L_\beta^{Dec}+L_{prior}+\lambda(U_\beta^{Dec}+U_{prior})$, where $\lambda$ is a regularization parameter. $L_\beta^{Dec}$ and $U_\beta^{Dec}$ may be computed using Monte Carlo sampling.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

When input classified data 124 and input unclassified data 126 are stored together in memory or in a single dataset, input classified data 124 may be extracted. Input classified data 124 and input unclassified data 126 together define a point set $x=\{x_1, \ldots, x_{N_C}, x_{N_C+1}, \ldots, x_N\}$, where N indicates a total number of data points or observation vectors $x_i$, where the observation vectors $x_i$ ($i \leq N_C$) are labeled such that $y_i \in Q$, and the remaining observation vectors $x_i$ ($N_C < i \leq N$) are unlabeled such that $y_i \notin Q$. Thus, $N_C$ indicates a number of classified observation vectors $x_i$ included in input classified data 124. For illustration, $N_C$ may be a small percentage, such as less than 1% of the total number of observation vectors N. $N_U$ indicates the number of unclassified observation vectors.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$, where $x_i=x_{i,j}$, $j=1, \ldots, N_v$. $x_{i,j}$ is a j variable value for the $i^{th}$ observation vector $x_i$. A number of the plurality of variables may be indicated by $N_v$. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes K=10 permissible values that may be indicated as Q={1, . . . , K}, where K is the number of classes included in the label set Q, and Q=1 may be associated with the digit "0", Q=2 may be associated with the digit "1", Q=3 may be associated with the digit "2", . . . , Q=10 may be associated with the digit "9". No $y_i$-variable (target) value or a variable value of zero may indicate that the associated observation vector $x_i$ is not labeled in input unclassified data 126. The label set Q further may be a binary indicator that indicates the existence or non-existence of a characteristic of each observation vector. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

In an alternative embodiment, the third indicator may not be received and/or selectable. For example, the number of classes K and label set Q may be determined automatically by identifying unique values of the $y_i$-variable included in input classified data 124 and including them in label set Q.

In an operation 206, a fourth indicator of a clustering algorithm that is executed to cluster data is received. For example, the fourth indicator indicates a name of a clustering algorithm. The fourth indicator may be received by classification application 122 after selection from a user interface window or after entry by a user into a user interface window. A default value for the clustering algorithm to execute may further be stored, for example, in computer-readable medium 108. In an alternative embodiment, the clustering algorithm may not be selectable. Example clustering algorithms include a k-means algorithm, Ward's minimum-variance algorithm, a hierarchical algorithm, a median algorithm, McQuitty's similarity analysis 20 algorithm, or other algorithms, for example, based on minimizing a cluster residual sum of squares as understood by a person of skill in the art.

In an operation 207, a fifth indicator of a label correction threshold $T_{lc}$ may be received. In an alternative embodiment, the fifth indicator may not be received. For example, a default value may be stored, for example, in computer-readable medium 108 and used automatically. In another alternative embodiment, the value of the label correction threshold $T_{lc}$ may not be selectable. Instead, a fixed, predefined value may be used. For illustration, a default value of the label correction threshold $T_{lc}$ may be 2.0 though any value greater than or equal to two may be used. A larger value for label correction threshold $T_{lc}$ indicates greater confidence that the selected labels are going to be wrong and thus noisier.

In an operation 208, a sixth indicator of a label error rate e may be received. In an alternative embodiment, the sixth indicator may not be received. For example, a default value may be stored, for example, in computer-readable medium 108 and used automatically. In another alternative embodiment, the value of the label error rate e may not be selectable. Instead, a fixed, predefined value may be used. For illustration, a default value of the label error rate e may be 0.2 though any value greater than or equal to zero and less than one may be used.

In an operation 209, observation vectors $\tilde{x}$ are randomly selected from input classified data 124 based on the label error rate e. For example, if e=0.2 and there are 100 observation vectors included in input classified data 124, the observation vectors $\tilde{x}$ include 20 observation vectors randomly selected from input classified data 124. The $y_i$-variable (target) value of each selected observation vector is randomly changed to any class of the number of classes K other than the $y_i$-variable (target) value associated with each respective observation vector to create corrupted observation vectors $\tilde{x}$. For example, if Q={1, . . . , 10}, and the $y_i$-variable (target) value is originally $y_i$=3 for an $i^{th}$ selected corrupted observation vector $\tilde{x}_i$, the $y_i$-variable (target) value $\tilde{y}_i$ is randomly changed to one of 1, 2, 4, 5, 6, 7, 8, 9, 10 selected with equal probability.

In an operation 210, cluster centers are defined by executing the clustering algorithm indicated in operation 206 to cluster input unclassified data 126 into a number of clusters equal to the number of classes K included in label set Q.

Each cluster center is defined by computing an average from each observation vector assigned to the same cluster.

In an operation 211, class centers are defined by computing an average of each observation vector of input classified data 124 grouped by class or label as defined by the $y_i$-variable (target) value of each observation vector of input classified data 124 including the corrupted observation vectors $\tilde{x}$. Each class center is determined by computing an average of each observation vector of input classified data 124 that has a respective class. A number of class centers is also the number of classes K in label set Q.

In an operation 212, a class is determined for each cluster center. For example, a distance is computed between each cluster center of the defined cluster centers and each class center of the class centers. The computed distances are ranked for each cluster center. A class is determined for each cluster center based on the class associated with the class center that is closest or has a minimum distance to each defined cluster center. For illustration, a Euclidean distance function may be used to compute the distances.

In an operation 214, a next classified observation vector is selected from input classified data 124. For example, on a first iteration of operation 214, a first observation vector is selected; on a second iteration of operation 214, a second observation vector is selected; etc.

In an operation 216, a distance is computed between the selected next classified observation vector and each cluster center of the defined cluster centers. For illustration, a Euclidean distance function may be used to compute the distance.

In an operation 218, a determination is made concerning whether the target variable value of the selected next classified observation vector is the unique class determined for a cluster center having a minimum computed distance value. When the target variable value of the selected next classified observation vector is the unique class determined for the cluster center having the minimum computed distance value, processing continues in an operation 226. When the target variable value of the selected next classified observation vector is not the unique class determined for the cluster center having the minimum computed distance value, processing continues in an operation 220.

In operation 220, a ratio value $r_v$ is computed between a second distance value and a first distance value, where the first distance value is the minimum computed distance value and the second distance value is the computed distance value to the cluster center having the unique class of the target variable value of the selected next classified observation vector. For example, the ratio value may be computed using $$r_v = \frac{e^{-d_1}}{\sum_{j=1}^{2} e^{-d_j}},$$

where $d_1$ is the first distance value, and $d_2$ is the second distance value. $r_v$ may define a probability that the selected next classified observation vector is actually a member of the cluster associated with the minimum computed distance value instead of the cluster associated with the cluster center having the unique class of the target variable value of the selected next classified observation vector. This is the result because the smaller the first distance value is, the larger the probability that the selected next classified observation vector belongs to a specific cluster and the associated class.

In an operation 222, a determination is made concerning whether the ratio value $r_v$ is greater than the label correction threshold $T_{lc}$ indicated in operation 208. When the ratio value is greater than the label correction threshold $T_{lc}$, processing continues in an operation 224. When the ratio value is less than or equal to the label correction threshold $T_{lc}$, processing continues in operation 226.

In operation 224, the target variable value of the selected next classified observation vector is changed to the unique class determined for the cluster center having the minimum computed distance value. Some or even all of the corrupted observation vectors $\tilde{x}$ may be changed back to the correct label or otherwise assigned a different class in operation 224.

In operation 226, a determination is made concerning whether input classified data 124 includes another observation vector to process. When input classified data 124 includes another observation vector, processing continues in operation 214 to process the next classified observation vector to determine if it is likely in error and thus a noisy label in need of automatic correction. When input classified data 124 does not include another observation vector, processing continues in an operation 230 shown referring to FIG. 2B.

In operation 230, a seventh indicator of a batch size $n_b$ may be received. In an alternative embodiment, the seventh indicator may not be received. For example, a default value may be stored, for example, in computer-readable medium 108 and used automatically. In another alternative embodiment, the value of the batch size $n_b$ may not be selectable. Instead, a fixed, predefined value may be used. For illustration, a default value for the batch size $n_b$ value may be $n_b=4$ though other values may be used.

In an operation 231, an eighth indicator indicates an architecture of a decoder model and its hyperparameters. For illustration, the decoder model may be a neural network model to be trained to classify input observation vectors. The eighth indicator may be received by classification application 122 from a user interface window or after entry by a user into a user interface window. A default value for the architecture may further be stored, for example, in computer-readable medium 108. For illustration, the decoder model architecture defines a plurality of layers and their connectivity including a type of each layer. Illustrative layers include an input layer, a convolution layer, a pooling layer, an output layer, a softmax layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, a recurrent neural network, etc. For illustration, the decoder model may be a deep neural network that includes three sets of 5 by 5 fully convolutional, rectified linear activation function (ReLU) and pooling layers followed by two fully connected hidden layers and a softmax layer.

Figure 3:
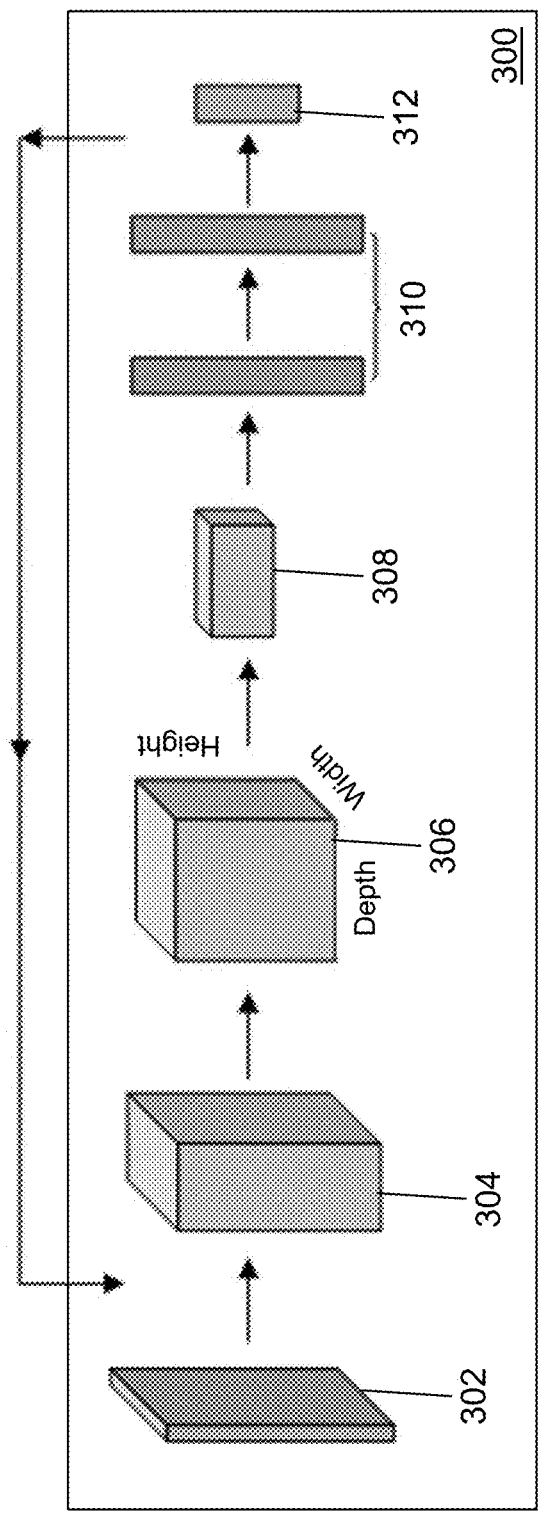
FIG. 3 depicts an illustrative neural network training process in accordance with an illustrative embodiment.

Referring to FIG. 3, an architecture 300 is shown in accordance with an illustrative embodiment. Architecture 300 includes an input layer 302 that provides input to a first convolution layer 304 that provides input to a second convolution layer 306 that provides input to a pooling layer 308 that provides input to a fully connected layer 310 that provides input to an output layer 312. Output layer 312 may be a last layer of the decoder model and may be a softmax function used to normalize the output to a probability distribution over the possible classes for each observation included in unclassified data 126.

A measure of an error in terms of an objective function is fed back to drive an adjustment of weights associated with each neuron of architecture 300. Gradients may be computed each iteration using back propagation through the architecture and also used to drive the adjustment of weights associated with each neuron of architecture 300.

The eighth indicator may further indicate other hyperparameters for the decoder model as well as an initial weight vector $w_0$ or a methodology by which the initial weight vector $w_0$ is defined. The eighth indicator may further indicate training parameters for the decoder model such as those associated with application of gradient descent in updating gradient vectors and weight vectors each iteration and in applying forward and backward propagation.

In an operation 232, a ninth indicator of a regularization parameter value $\lambda$ may be received. In an alternative embodiment, the ninth indicator may not be received. For example, default values may be stored, for example, in computer-readable medium 108 and used automatically. In another alternative embodiment, the value of the regularization parameter $\lambda$ may not be selectable. Instead, a fixed, predefined value may be used. For illustration, a default value of the regularization parameter $\lambda$ may be computed using $$\lambda = \frac{N_U}{N_C}$$

though other values may be used.

In an operation 233, a tenth indicator indicates an architecture of an encoder model and its hyperparameters. For illustration, the encoder model may be a neural network model to be trained to generate new observation vectors. The tenth indicator may be received by classification application 122 from a user interface window or after entry by a user into a user interface window. A default value for the architecture may further be stored, for example, in computer-readable medium 108. For illustration, the encoder model architecture defines a plurality of layers and their connectivity including a type of each layer. Illustrative layers include an input layer, a convolution layer, a pooling layer, an output layer, etc. One or more hyperparameters may be defined for each layer that may vary based on a type of each layer. For example, an activation function, a number of neurons, a number of groups, a dropout rate, a height and/or a width of a convolution window, a number of filters, an initialization method for filter weights, width and height padding dimensions, a number of categories or labels or unique values of the target variable value $y_i$, a detection threshold, etc. may be defined as hyperparameters for training the neural network. The architecture may define a convolutional neural network, a deep, fully connected neural network, a recurrent neural network, etc. For illustration, the encoder model may be a deep neural network that includes three sets of 5 by 5 fully convolutional, ReLU and pooling layers followed by two fully connected hidden layers.

The tenth indicator may further indicate other hyperparameters for the encoder model as well as an initial weight vector $w_0$ or a methodology by which the initial weight vector $w_0$ is defined. The tenth indicator may further indicate training parameters for the encoder model such as those associated with application of gradient descent in updating gradient vectors and weight vectors each iteration and in applying forward and backward propagation.

In an operation 234, an eleventh indicator of the $\beta$ value may be received for the $\beta$-divergence. In an alternative embodiment, the eleventh indicator may not be received. For example, default values may be stored, for example, in computer-readable medium 108 and used automatically. In another alternative embodiment, the $\beta$ value may not be selectable. Instead, fixed, predefined values may be used. For illustration, a default value of $\beta$ may be between 0.1 and 0.4, though other values may be used.

In an operation 235, a twelfth indicator of a maximum number of iterations $I_{max}$ may be received. In an alternative embodiment, the twelfth indicator may not be received. For example, a default value may be stored, for example, in computer-readable medium 108 and used automatically. In another alternative embodiment, the maximum number of iterations $I_{max}$ may not be selectable. Instead, a fixed, predefined value may be used. For illustration, a default value of the maximum number of iterations $I_{max}=100$, though other values may be used.

In an operation 236, a thirteenth indicator of a convergence threshold value $c_{th}$ may be received. In an alternative embodiment, the thirteenth indicator may not be received. For example, a default value may be stored, for example, in computer-readable medium 108 and used automatically. In another alternative embodiment, the value of the convergence threshold value $c_{th}$ may not be selectable. Instead, a fixed, predefined value may be used. For illustration, a default value of the convergence threshold value $c_{th}$ may be 0.01, though other values may be used.

In an operation 237, a fourteenth indicator of a noise function may be received. For example, the fourteenth indicator indicates a name of a noise function. The fourteenth indicator may be received by classification application 122 after selection from a user interface window or after entry by a user into a user interface window. A default value for the noise function may further be stored, for example, in computer-readable medium 108. As an example, a noise function may be selected from "Gaussian", "Uniform", etc. For example, a default noise function may be the Gaussian function. Of course, the noise function may be labeled or selected in a variety of different manners by the user as understood by a person of skill in the art. In an alternative embodiment, the noise function may not be selectable, and a single noise function is implemented in classification application 122. For example, the Gaussian function may be used by default or without allowing a selection. With the selection of the noise function, parameters associated with the selected noise function may be provided using the fourteenth indicator. For example, when Gaussian function is used, a mean and a variance may be provided. In an illustrative embodiment, a Gaussian function with a mean value of zero and a unit value for the variance may be defined and used by default.

In an operation 238, a fifteenth indicator of noise transition matrix M may be received that has dimension K×K with the $(i,j)^{th}$ element of the matrix M representing a probability that an observation vector belongs to class i but is labeled to be class j. For example, the probability may be estimated from past data. In an alternative embodiment, the fifteenth indicator may not be received. For example, a default value may be stored, for example, in computer-readable medium 108 and used automatically. In another alternative embodiment, the values for the transition matrix M may not be selectable. Instead, fixed, predefined values may be used.

In an operation 239, an iteration counter I is initialized, for example, as I=1.

In an operation 240, the batch size $n_b$ number of observation vectors are selected from input classified data 124 to define a set of classified observation vectors $X_C$, and the batch size $n_b$ number of observation vectors are selected from input unclassified data 126 to define a set of unclassified observation vectors $X_U$. The observation vectors may be randomly selected from input classified data 124 with replacement in an illustrative embodiment. The observation vectors may be randomly selected from input unclassified data 126 with replacement in an illustrative embodiment.

In an operation 241, a sum of the prior regularization error values, $L_{prior}+\lambda U_{prior}$, is computed based on $L_{prior}+\lambda U_{prior}=D_\beta[q(H|x,\tilde{y}),p(H)]+\lambda D_\beta[q(H_U|x), p(H_U)]$, where $D_\beta$ indicates a distance computation using the β-divergence with the β defined in operation 234, $q(H|x,\tilde{y})$ indicates an approximated posterior distribution of hidden variables H given an observation vector x of the plurality of classified observation vectors and the target variable value $\tilde{y}$ of observation vector x after (O), p(H) indicates a prior probability for the hidden variables H, $q(H_U|x)$ indicates an approximated posterior distribution of second hidden variables $H_U$ given the observation vector x, and $p(H_U)$ indicates a prior probability distribution for the plurality of unclassified observation vectors. $q(H|x,\tilde{y})$ may be computed using $$q(H|x, \tilde{y}) = \frac{\sum_{\hat{y}^r} p(\tilde{y} = \tilde{y}^r | \hat{y} = \hat{y}^r) q(\hat{y}|H, x) q(H|x)}{\sum_{\hat{y}^r} p(\tilde{y} = \tilde{y}^r | \hat{y} = \hat{y}^r) q(\hat{y}|x)}. \quad q(H_U|x)$$

may be computed using $q(H_U|x)=q(a,z,\mu,\Lambda,T,\tilde{y},w|x)=q(z|a,\tilde{y},x)q(a|x)q(\tilde{y}|a,x)q(T,\mu,\Lambda,w|x)$. $p(H_U)$ may be computed using $p(H_U)=p(x,z,a,\omega,T,C,\mu,\Lambda)=p_\theta(x|\omega,T,C)p_\theta(T|Z,\mu,\Lambda)p_\theta(a|z,x)p_\theta(x,z)$. p(H) may be computed using $p(H)=p(a,z,T,w,\mu,\Lambda)$.

In an operation 242, a sum of the decoder reconstruction error values, $L_\beta^{Dec}+\mu U_\beta^{Dec}$, is computed using Monte Carlo sampling to compute an approximation by averaging a predefined number of samples of $$L_\beta = \int q(H|x, \tilde{y})$$
$$\left(-\frac{\beta+1}{\beta}\sum_{i=1}^N p(\tilde{y}_i|H;x_i)^\beta + N\int\sum_{i=1}^N p(\tilde{y}|H;x)^{1+\beta}d\tilde{y}\right) +$$
$$D_\beta[q(H|x, \tilde{y}), p(H_u)] \text{ and } U_\beta =$$
$$\int q(H_u|x)\left(-\frac{\beta+1}{\beta}\sum_{i=1}^N p(x_i|H_u)^\beta + \int p(x_i|H_u)^{1+\beta}dx\right) +$$
$$D_\beta[q(H_u|x), p(H_u)]$$

to replace the integration.

In an operation 243, the batch size $n_b$ number of observation vectors are generated using the noise function indicated in operation 237 to define variable values for each of the number of the plurality of variables $N_v$ and for each auxiliary observation vector z. A set of noise observation vectors $X_n$ is defined.

In an operation 244, an ELBO gradient $\nabla\theta_{Dec}$ is computed using the ELBO parameters $L_\beta^{Dec}+L_{prior}+\lambda(U_\beta^{Dec}+U_{prior})$. Due to the multiple integrations, the gradient is not directly tractable to calculate. However, a mini-batch gradient descent method, such as that described in *An overview of gradient descent optimization algorithms* first published in a blog post by Sebastian Ruder on Jan. 19, 2016, may be used to provide an efficient solution to compute the gradient. The loss function is $L_\beta^{Dec}+L_{prior}+\lambda(U_\beta^{Dec}+U_{prior})$, and the parameters are $\theta_{Dec}, L_\beta^{Dec}, L_{prior}, U_\beta^{Dec}, U_{prior}$. The ELBO gradient also defines the optimization or convergence parameter value $c=\nabla\theta_{Dec}(L_\beta^{Dec}+L_{prior}+\lambda(U_\beta^{Dec}+U_{prior}))$.

In an operation 245, an encoder gradient $\nabla\theta_{Enc}L(\theta_{Enc}, \theta_{Dec})$ for the encoder model parameters $\theta_{Enc}$ and the decoder model parameters $\theta_{Dec}$ are computed, where the encoder model parameters $\theta_{Enc}$ and the decoder model parameters $\theta_{Dec}$ were initialized based on initialization of the encoder model and the decoder model prior to operation 240. For example, $\nabla\theta_{Enc}L(\theta_{Enc}, \theta_{Dec})$ is the gradient vector $g_k$ computed from a last backpropagation of the encoder model from a mini-batch gradient descent method with the loss function $L_\beta^{Dec}+L_{prior}+\lambda(U_\beta^{Dec}+U_{prior})$.

In an operation 246, the ELBO parameters are updated using the computed ELBO gradient based on $\theta_{Dec}=\theta_{Dec}-\nabla\theta_{Dec}(L_\beta^{Dec}+L_{prior}+\lambda(U_\beta^{Dec}+U_{prior}))$.

In an operation 247, the decoder model defined by the architecture specified in operation 231 is updated with $X_C$, $X_U$, and $X_n$ over a predefined number of epochs to compute an updated decoder weight vector $\theta_{Dec}$ and an updated decoder gradient vector $\nabla\theta_{Dec}$ that include values for each neuron of the decoder model, where $\theta_{Dec}=\theta_{Dec}-\nabla\theta_{Dec}L(\theta_{Enc}, \theta_{Dec})$. For example, $\nabla\theta_{Dec}L(\theta_{Enc}, \theta_{Dec})$ is the gradient vector $g_k$ computed from a last backpropagation of the decoder model. The decoder model is updated by ascending its stochastic gradient to minimize a classification loss.

In an operation 248, the encoder model defined by the architecture specified in operation 233 is updated with $X_C$, $X_U$, and $X_n$ over the predefined number of epochs to compute an updated encoder weight vector $\theta_{Enc}$ and an updated encoder gradient vector $\nabla\theta_{Enc}$ that includes values for each neuron of the encoder model, where $\theta_{Enc}=\theta_{Enc}+\nabla\theta_{Enc}L(\theta_{Enc}, \theta_{Dec})$. The encoder model is updated by descending its stochastic gradient to maximize a classification loss. An output of the encoder model is a batch number $n_b$ of auxiliary observations z. Processing continues in an operation 250 shown referring to FIG. 2C.

In operation 250, a determination is made concerning whether convergence has been achieved or the maximum number of iterations have been performed. If $c \leq c_{th}$ or $I \geq I_{max}$, processing continues in an operation 254. If $c>c_{th}$ and $I<I_{max}$, processing continues in an operation 252.

In operation 252, the iteration counter I is incremented, for example, as I=I+1, and processing continues in operation 240 shown referring to FIG. 2B.

In operation 254, the decoder neural network model description including updated decoder weight vector $\theta_{Dec}$ may be output for the updated decoder model. For example, the updated decoder model may be output to decoder model description 128. The neural network model description may include the neural network architecture. For illustration, the trained decoder model may be stored using the ASTORE procedure provided by SAS® Visual Data Mining and Machine Learning software. The classification for each observation vector included in input unclassified data 126 may be output to classification output data 130 with or without a respective observation vector.

Figure 4:
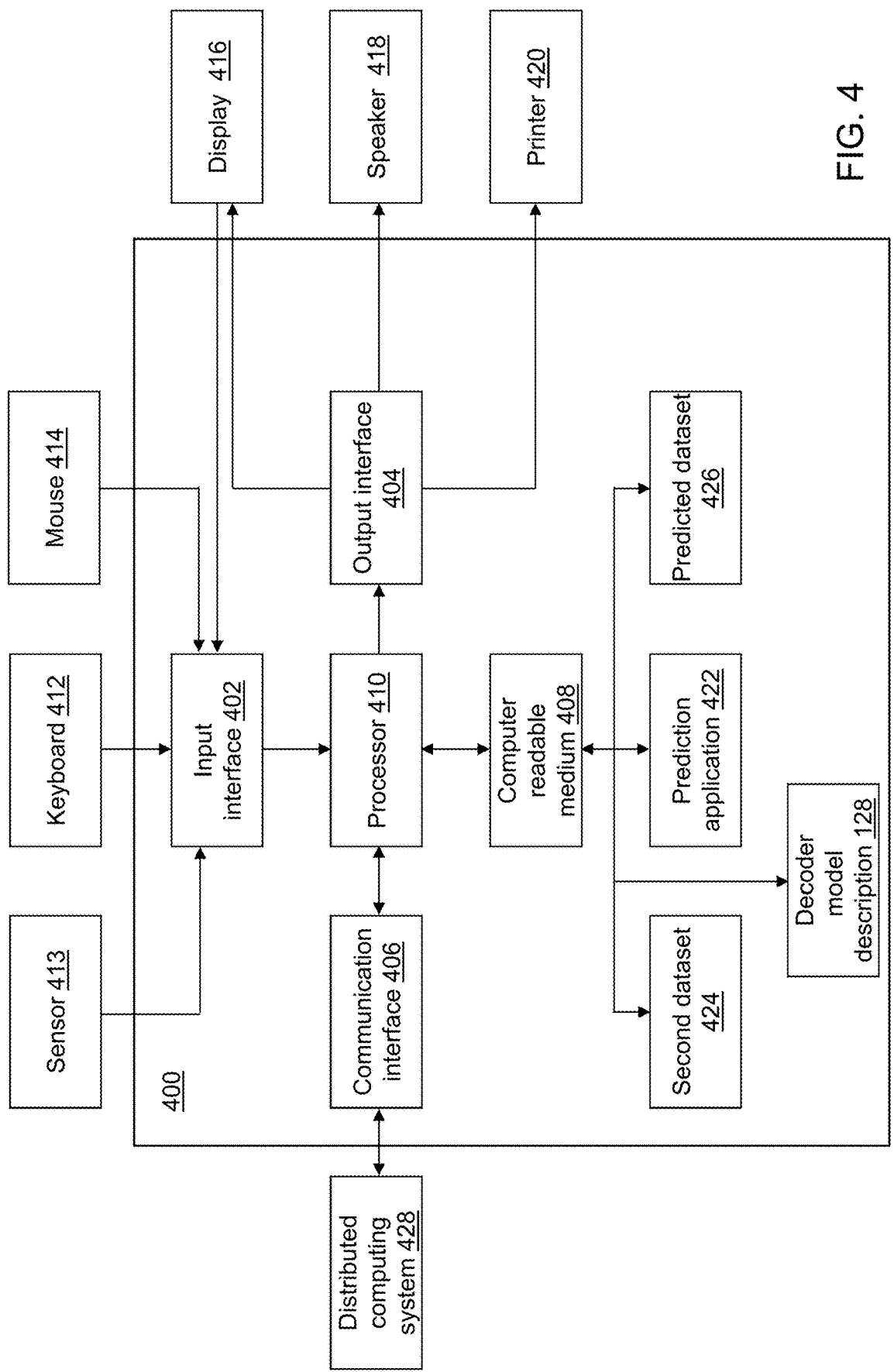
FIG. 4 depicts a block diagram of a prediction device in accordance with an illustrative embodiment.

Referring to FIG. 4, a block diagram of a prediction device 400 is shown in accordance with an illustrative embodiment. Prediction device 400 may include a second input interface 402, a second output interface 404, a second communication interface 406, a second non-transitory computer-readable medium 408, a second processor 410, a prediction application 422, second dataset 424, predicted dataset 426, and decoder model description 128. Fewer, different, and/or additional components may be incorporated into prediction device 400. Prediction device 400 and classification device 100 may be the same or different devices.

Second input interface 402 provides the same or similar functionality as that described with reference to input interface 102 of classification device 100 though referring to prediction device 400. Second output interface 404 provides the same or similar functionality as that described with reference to output interface 104 of classification device 100 though referring to prediction device 400. Second communication interface 406 provides the same or similar functionality as that described with reference to communication interface 106 of classification device 100 though referring to prediction device 400. Data and messages may be transferred between prediction device 400 and a distributed computing system 428 using second communication interface 406. Distributed computing system 132 and distributed computing system 428 may be the same or different computing systems. Second computer-readable medium 408 provides the same or similar functionality as that described with reference to computer-readable medium 108 of classification device 100 though referring to prediction device 400. Second processor 410 provides the same or similar functionality as that described with reference to processor 110 of classification device 100 though referring to prediction device 400.

Prediction application 422 performs operations associated with classifying or predicting a characteristic value related to each observation vector included in second dataset 424. The predicted characteristic value may be stored in predicted dataset 426 to support various data analysis functions as well as provide alert/messaging related to each prediction that may be a classification. Dependent on the type of data stored in input classified data 124, input unclassified data 126, and second dataset 424, prediction application 422 may identify anomalies as part of process control, for example, of a manufacturing process, for machine condition monitoring, for image classification, for intrusion detection, for fraud detection, for text recognition, for voice recognition, for language translation, etc. Some or all of the operations described herein may be embodied in prediction application 422. The operations may be implemented using hardware, firmware, software, or any combination of these methods.

Referring to the example embodiment of FIG. 4, prediction application 422 is implemented in software (comprising computer-readable and/or computer-executable instructions) stored in second computer-readable medium 408 and accessible by second processor 410 for execution of the instructions that embody the operations of prediction application 422. Prediction application 422 may be written using one or more programming languages, assembly languages, scripting languages, etc. Prediction application 422 may be integrated with other analytic tools. As an example, prediction application 422 may be part of an integrated data analytics software application and/or software architecture such as that offered by SAS Institute Inc. of Cary, N.C., USA. For example, prediction application 422 may be part of SAS® Enterprise Miner™ developed and provided by SAS Institute Inc. of Cary, N.C., USA. Merely for further illustration, prediction application 422 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Visual Analytics, SAS® Viya™, SAS In-Memory Statistics for Hadoop®, all of which are developed and provided by SAS Institute Inc. of Cary, N.C., USA.

One or more operations of prediction application 422 further may be performed by an ESPE on an event stream instead of reading observation vectors from second dataset 424. Prediction application 422 and classification application 122 may be the same or different applications that are integrated in various manners to train the decoder model using input classified data 124 and input unclassified data 126 that may be distributed on distributed computing system 132 and to execute the trained decoder model to predict the characteristic of each observation vector included in second dataset 424 that may be distributed on distributed computing system 428.

Prediction application 422 may be implemented as a Web application. Prediction application 422 may be integrated with other system processing tools to automatically process data generated as part of operation of an enterprise, to classify data in the processed data, and/or to provide a warning or alert associated with the prediction using second input interface 402 and/or second communication interface 406 so that appropriate action can be initiated in response. For example, a warning or an alert may be presented using a second display 416, a second speaker 418, a second printer 420, etc. or sent to one or more computer-readable media, display, speaker, printer, etc. of distributed computing system 428.

Input classified data 124, input unclassified data 126, and second dataset 424 may be generated, stored, and accessed using the same or different mechanisms. The target variable is not defined in second dataset 424. Similar to input classified data 124 and input unclassified data 126, second dataset 424 may include a plurality of rows and a plurality of columns with the plurality of rows referred to as observations or records, and the columns referred to as variables that are associated with an observation. Second dataset 424 may be transposed.

Similar to input classified data 124 and input unclassified data 126, second dataset 424 may be stored on second computer-readable medium 408 or on one or more computer-readable media of distributed computing system 428 and accessed by prediction device 400 using second communication interface 406. Data stored in second dataset 424 may be a sensor measurement or a data communication value, for example, from a sensor 413, may be generated or captured in response to occurrence of an event or a transaction, generated by a device such as in response to an interaction by a user with the device, for example, from a second keyboard 412 or a second mouse 414, etc. The data stored in second dataset 424 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 424 may be captured at different time points periodically, intermittently, when an event occurs, etc. One or more columns may include a time value. Similar to input classified data 124 and input unclassified data 126, data stored in second dataset 424 may be generated as part of the IoT, and some or all data may be pre- or post-processed by an ESPE.

Similar to input classified data 124 and input unclassified data 126, second dataset 424 may be stored in various compressed formats such as a coordinate format, a compressed sparse column format, a compressed sparse row format, etc. Second dataset 424 further may be stored using various structures as known to those skilled in the art including a file system, a relational database, a system of tables, a structured query language database, etc. on prediction device 400 and/or on distributed computing system 428. Prediction device 400 may coordinate access to second dataset 424 that is distributed across a plurality of computing devices that make up distributed computing system 428. For example, second dataset 424 may be stored in a cube distributed across a grid of computers as understood by a person of skill in the art. As another example, second dataset 424 may be stored in a multi-node Hadoop® cluster. As another example, second dataset 424 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in second dataset 424.

Figure 5:
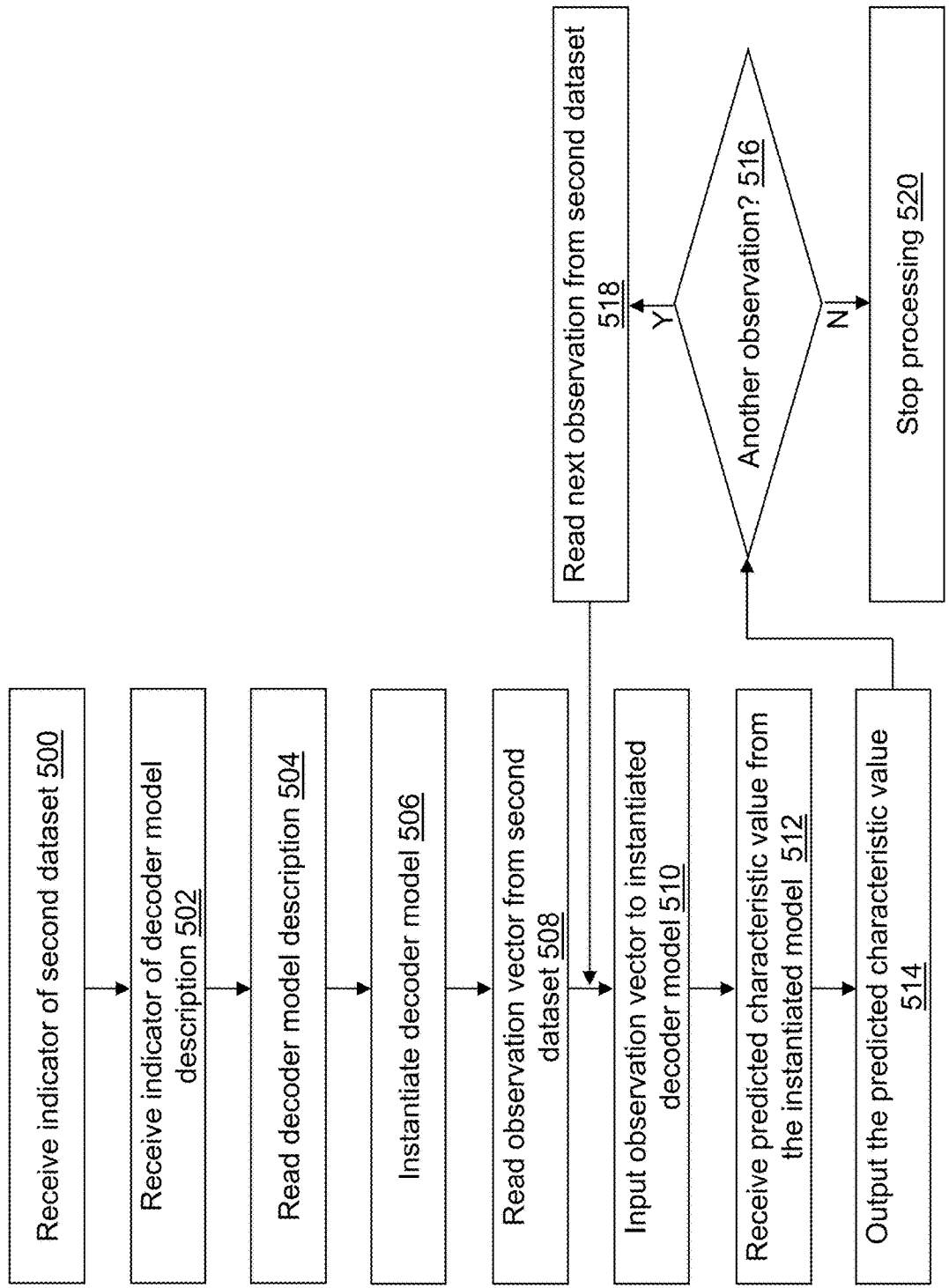
FIG. 5 depicts a flow diagram illustrating examples of operations performed by the prediction device of FIG. 4 in determining a classification in accordance with an illustrative embodiment.

Referring to FIG. 5, example operations of prediction application 422 are described to classify new data. Additional, fewer, or different operations may be performed depending on the embodiment of prediction application 422. The order of presentation of the operations of FIG. 5 is not intended to be limiting. Although some of the operational flows are presented in sequence, the various operations may be performed in various repetitions, concurrently (in parallel, for example, using threads and/or distributed computing system 428), and/or in other orders than those that are illustrated.

In an operation 500, a sixteenth indicator may be received that indicates second dataset 424. For example, the sixteenth indicator indicates a location and a name of second dataset 424. As an example, the sixteenth indicator may be received by prediction application 422 after selection from a user interface window or after entry by a user into a user interface window. In an alternative embodiment, second dataset 424 may not be selectable. For example, a most recently created dataset may be used automatically.

In an operation 502, a seventeenth indicator may be received that indicates decoder model description 128. For example, the seventeenth indicator indicates a location and a name of decoder model description 128. As an example, the seventeenth indicator may be received by prediction application 422 after selection from a user interface window or after entry by a user into a user interface window. In an alternative embodiment, decoder model description 128 may not be selectable. For example, a most recently created model configuration data may be used automatically. As another example, decoder model description 128 may be provided automatically as part of integration with classification application 122.

In an operation 504, a decoder model description is read from decoder model description 128.

In an operation 506, a decoder model is instantiated with the decoder model description. For example, the architecture of the neural network model, its hyperparameters, its weight vector, and other characterizing elements are read and used to instantiate a neural network model based on the information output from the training process in operation 262.

In an operation 508, an observation vector is read from second dataset 424.

In an operation 510, the observation vector is input to the instantiated decoder model.

In an operation 512, a predicted characteristic value for the read observation vector is received as an output of the instantiated model. The output may include a probability that the observation vector has one or more different possible characteristic values. For example, the predicted characteristic value may be a class assigned to the read observation vector. The possible class values may be associated with the label set Q. The label set Q may be stored in decoder model description 128 or in a file indicated in decoder model description 128 or may be otherwise provided as an input to prediction application 422.

In an operation 514, the predicted characteristic value may be output, for example, by storing the predicted characteristic value with the observation vector to predicted dataset 426. In addition, or in the alternative, the predicted characteristic value may be presented on second display 416, printed on second printer 420, sent to another computing device using second communication interface 406, an alarm or other alert signal may be sounded through second speaker 418, etc.

In an operation 516, a determination is made concerning whether second dataset 424 includes another observation vector. When second dataset 424 includes another observation vector, processing continues in an operation 518. When second dataset 424 does not include another observation vector, processing continues in an operation 520.

In operation 518, a next observation vector is read from second dataset 424, and processing continues in operation 510.

In operation 520, processing stops.

The operations of classification application 122 and prediction application 422 can be executed in parallel to speed up the training process and/or the classifying process. Classification application 122 may be executed in a synchronous mode that distributes the gradient computations across a plurality of worker computing devices. Each worker computing device computes the gradient for a portion of input classified data 124 and input unclassified data 126 that resides on that worker computing device, and the computed gradients are aggregated on a controller computing device. The weights are updated with the computed gradients and are sent to each worker computing device so that the processing for the next iteration can proceed with the updated weights.

Figure 6:
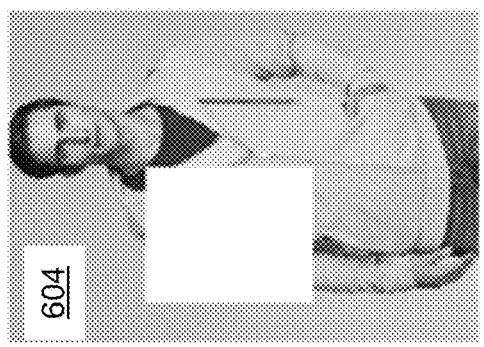
FIG. 6 shows example images with compound noise detected by a classification model trained using the classification application of FIGS. 2A through 2C in accordance with an illustrative embodiment.
Figure 6:
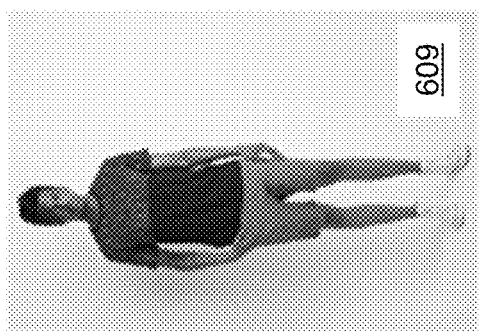
Figure 6:
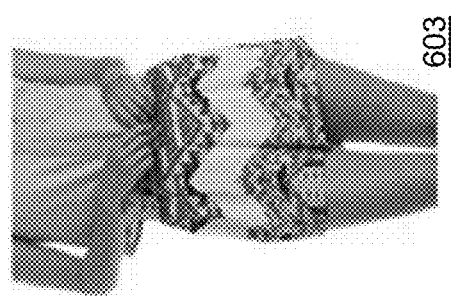
Figure 6:
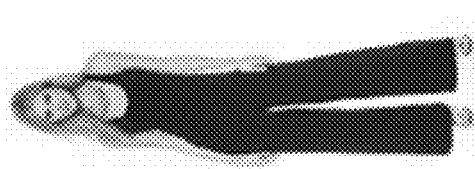
Figure 6:
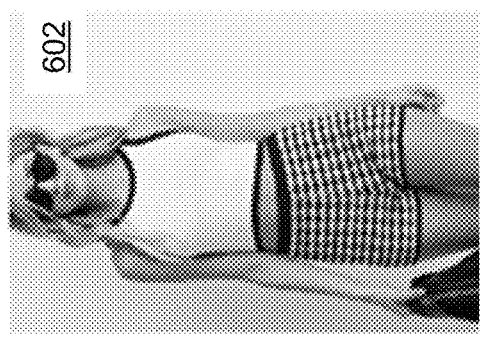
Figure 6:
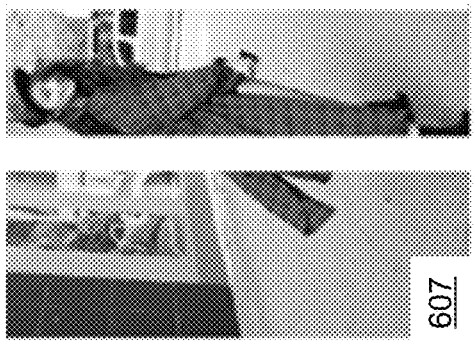
Figure 6:
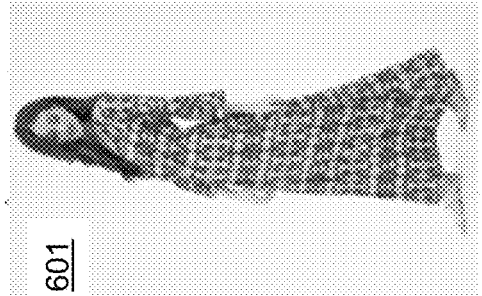
Figure 6:
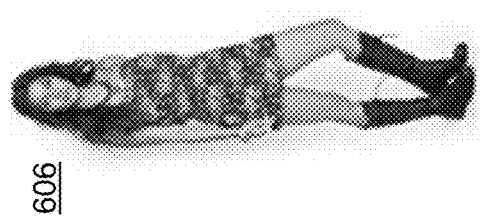
Figure 6:
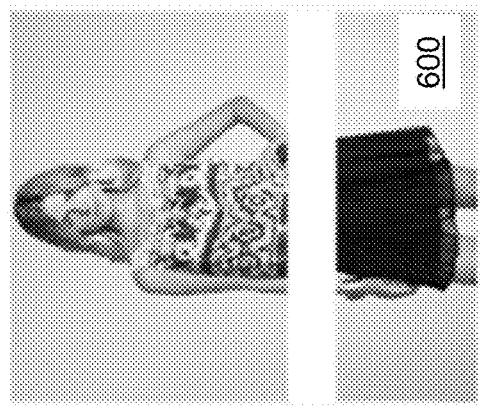
Figure 6:
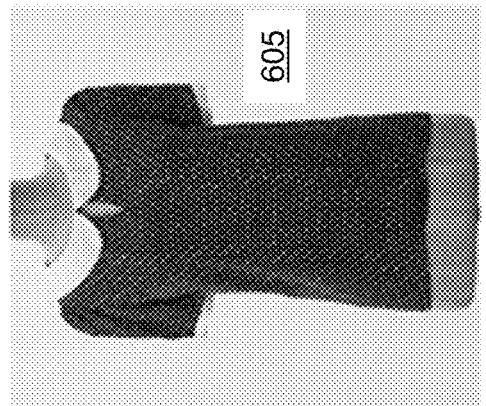

A performance of classification application 122 was evaluated using a Clothing1M dataset that includes 1 million training images obtained from online shopping websites with classes generated from surrounding text. Referring to FIG. 6, example images with compound noise were detected by classification application 122 in the Clothing1M dataset based on operations 209-226. A first image 600 had a false label of blouse with a true label of skirts; a second image 601 had a false label of romper with a true label of dress; a third image 602 had a false label of sweater with a true label of romper; a fourth image 603 had a false label of culottes with a true label of short; a fifth image 604 had a false label of sweater with a true label of hoodie; a sixth image 605 had a false label of sweater with a true label of blouse; a seventh image 606 had a false label of short with a true label of romper; an eighth image 607 had a false label of jumpsuit with a true label of shirt; a ninth image 608 had a false label of blouse with a true label of jumpsuit; and a tenth image 609 had a false label of short with a true label of blouse. The examples demonstrate the efficacy of classification application 122 in the detection of images with noisy labels.

A performance of classification application 122 was evaluated using the CIFAR-10 and CIFAR-100 datasets. Both CIFAR-10 and CIFAR-100 contain 50,000 training images and 10,000 test images of size 32 by 32. Each dataset was randomly sampled and divided into three disjointed subsets including classified dataset 124 (5% samples), unclassified dataset 126 (75% samples) and a test dataset (20% samples). Outlier observations were created by randomly replacing 10% to 20% of the features in the data with zeros. Symmetric label noise was generated by randomly replacing the assigned label for a percentage of the training data with any of the other possible labels.

Figure 7:
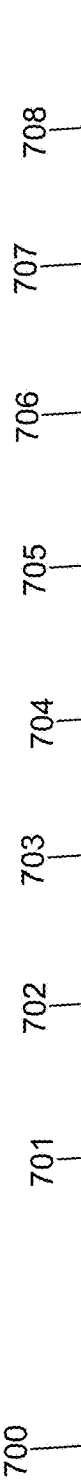
FIG. 7 shows a first accuracy comparison using two datasets between existing classification methods and the classification model trained using the classification application of FIGS. 2A through 2C in accordance with an illustrative embodiment.

Referring to FIG. 7, a first classification accuracy table 700 is shown that was generated based on training a decoder model using classification application 122 (URSVAE) and training using ten different existing classification methods with different levels of label noise and outliers included in the CIFAR-10 (C10) and CIFAR-100 (C100) datasets. The CIFAR-10 dataset included 60,000 32×32 color images in 10 classes with 6,000 images per class. The CIFAR-100 dataset included 60,000 32×32 color images in 100 classes with 600 images per class. A first column 701 shows an accuracy for each classification method using the CIFAR-10 dataset with 50% label noise and 10% outlier observations. A second column 702 shows an accuracy for each classification method using the CIFAR-10 dataset with 80% label noise and 10% outlier observations. A third column 703 shows an accuracy for each classification method using the CIFAR-10 dataset with 50% label noise and 20% outlier observations. A fourth column 704 shows an accuracy for each classification method using the CIFAR-10 dataset with 80% label noise and 20% outlier observations. A fifth column 705 shows an accuracy for each classification method using the CIFAR-100 dataset with 50% label noise and 10% outlier observations. A sixth column 706 shows an accuracy for each classification method using the CIFAR-100 dataset with 80% label noise and 10% outlier observations. A seventh column 707 shows an accuracy for each classification method using the CIFAR-100 dataset with 50% label noise and 20% outlier observations. An eighth column 708 shows an accuracy for each classification method using the CIFAR-100 dataset with 80% label noise and 20% outlier observations.

The ten existing classification methods were implemented based on public code where VAT represents the method described in a paper by Miyato, T., et al., *Distributional Smoothing with Virtual Adversarial Training*, arXiv preprint arXiv:1507.00677, 2015; LadderNet represents the method described in a paper by Rasmus, A., et al., *Semi-supervised learning with ladder networks*, Neural Information Processing Systems, 2015; ADGM represents the method described in a paper by Maaløe, L., et al., *Auxiliary Deep Generative Models*, International Conference on Machine Learning, 2017; Coteaching represents the method described in a paper by Yu, X., et al., *How does disagreement help generalization against label corruption?*, International Conference on Machine Learning, 2019; M-correct represents the method described in a paper by Arazo, E., et al., *Unsupervised Label Noise Modeling and Loss Correction*, International Conference on Machine Learning, 2019; P-correct represents the method described in a paper by Yi, K. and Wu, J., *Probabilistic end-to-end noise correction for learning with noisy labels*, IEEE Conference on Computer Vision and Pattern Recognition, 2019; MetaLearn represents the method described in a paper by Li, J., et al., *Learning to Learn from Noisy Labeled Data*, IEEE Conference on Computer Vision and Pattern Recognition, 2019; Dividemix represents the method described in a paper by Li, J., et al., *DIVIDEMIX: Learning with noisy labels as semi-supervised learning*, International Conference on Learning Representation, 2020; RGAN represents the method described in a paper by Kaneko, T., et al., *Label-Noise Robust Generative Adversarial Network*, IEEE Conference on Computer Vision and Pattern Recognition, 2019; and AmbientGAN represents the method described in a paper by Bora, A., et al., *AmbientGAN: Generative models from lossy measurements*, International Conference of Learning Representations, 2018.

MetaLearn applies a noise-tolerant training algorithm relying on a metalearning update. P-correct tackles the noisy labels by training an end-to-end framework that can update network parameters and label estimations as label distributions. Coteaching techniques train deep neural networks robustly against noisy labels. Dividemix models the per-sample loss with a mixture model to dynamically divide the training data into a labeled set with clean samples and an unlabeled set with noisy samples and trains two diverged networks simultaneously. In the training of AmbientGAN, the output of the generator is passed through a simulated random measurement function to cope with lossy measurement. RGAN incorporates a noise transitional model to learn a clean label generative distribution.

The encoder and decoder models were parameterized using a deep neural network with three sets of 5 by 5 fully convolutional, ReLU and pooling layers followed by two fully connected hidden layers where each pair of layers contains the hidden units as dim(h)=500 or dim(h)=1000. For a fair comparison, the dimensions of the auxiliary variables a, namely dim(a; z)=100 and the latent variable z were set to be the same as for ADGM. In the illustrative results herein, the neural networks of the encoder and decoder models were trained with stochastic gradient descent (SGD) using a batch size of 128. A momentum of 0.9 was set with a weight decay of 0.0005. The network was trained for 300 epochs with an initial learning rate of 0.02 that was reduced by a factor of 10 after 150 epochs. A warm up period of 10 epochs was used for CIFAR-10, and a warm up period of 30 epochs was used for CIFAR-100. $\lambda$ was defined as the ratio of the number of unclassified observations versus the number of classified observations. $\beta$ was varied from 0.1 to 0.4, where the best performance is included in first classification accuracy table 700. All of the network parameters were initialized using the scheme described in a paper by Glorot, X. and Bengio, Y., *Understanding the difficulty of training deep feedforward neural networks*, AISTATS, 2010.

The results included in first classification accuracy table 700 show that classification application 122 implementing URSVAE achieved the highest accuracy for the CIFAR-10 and CIFAR-100 datasets for all levels of label noise and of the percentage of outlier observations in classified data 124. In most cases, the accuracy is significantly better. The better performance with respect to Dividemix and RGAN is mainly because URSVAE efficiently rejects the outliers by placing a smaller or zero weight on them. The performance gain compared to AmbientGAN can be attributed to the fact that URSVAE successfully suppresses the samples with noisy labels by integrating the noise transition model in the optimization.

Relative to computation time, URSVAE is also faster relative to all but the Coteaching classification method as shown in Table 1 below where the times are in hours.

TABLE 1

| Coteaching | P-correct | Meta-Learn | Divide-mix | RGAN | Ambient-GAN | URSVAE |
|---|---|---|---|---|---|---|
| 4.3 | 6.0 | 8.6 | 5.8 | 7.2 | 6.7 | 4.9 |

The other methods evaluated are baseline methods that are not state-of-the-art and do not include any denoising functionality. As a result, the computation time were not included for the baseline methods.

Figure 8:
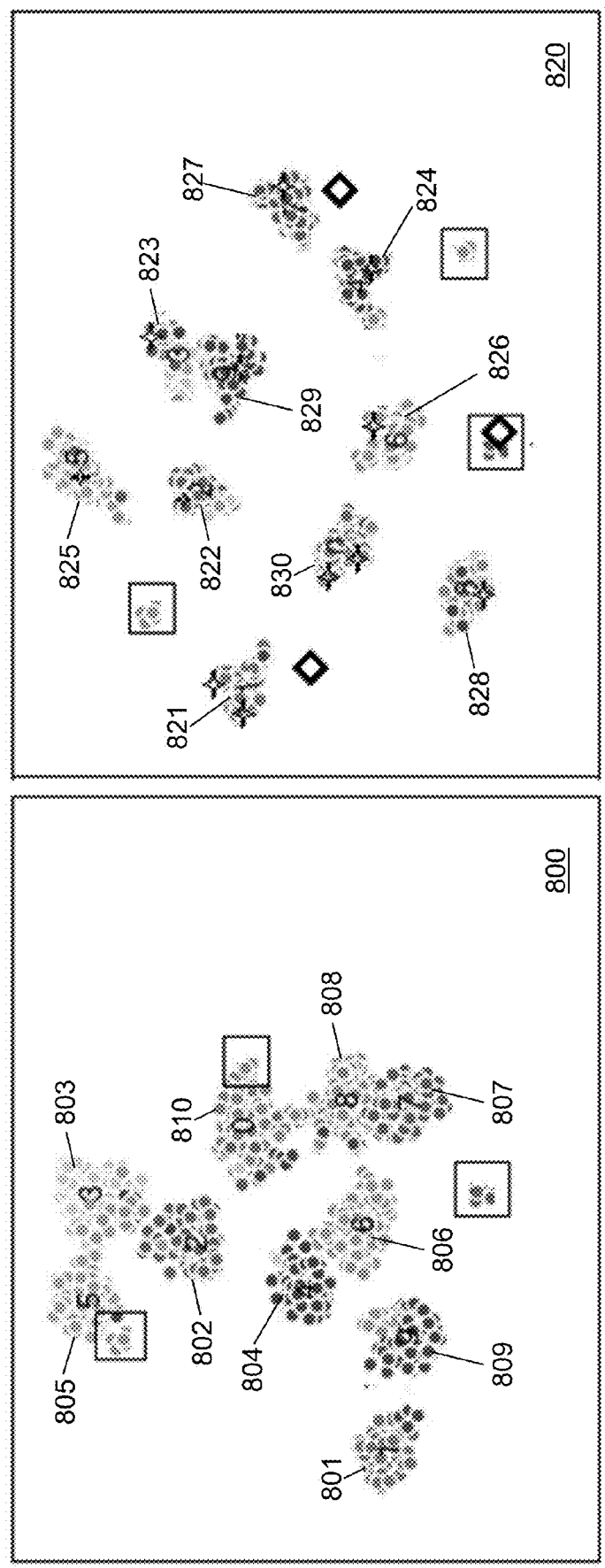
FIG. 8 shows a two-dimensional t-distributed stochastic neighbor embedding visualization comparison between an existing classification method and the classification model trained using the classification application of FIGS. 2A through 2C in accordance with an illustrative embodiment.

FIG. 8 shows a two-dimensional t-distributed stochastic neighbor embedding visualization of the auxiliary latent space for the CIFAR-10 dataset. The label noise was 20%, and the percentage of outlier observations was 10%. A first graph 800 was generated using ADGM, and a second graph 820 was generated using classification application 122 implementing URSVAE with β=0.15. First graph 800 includes a first cluster 801 for index number 1, a second cluster 802 for index number 2, a third cluster 803 for index number 3, a fourth cluster 804 for index number 4, a fifth cluster 805 for index number 5, a sixth cluster 806 for index number 6, a seventh cluster 807 for index number 7, an eighth cluster 808 for index number 8, a ninth cluster 809 for index number 9, and a tenth cluster 810 for index number 0. Each index number is associated with a different class. Second graph 820 includes a first cluster 821 for index number 1, a second cluster 822 for index number 2, a third cluster 823 for index number 3, a fourth cluster 824 for index number 4, a fifth cluster 825 for index number 5, a sixth cluster 826 for index number 6, a seventh cluster 827 for index number 7, an eighth cluster 828 for index number 8, a ninth cluster 829 for index number 9, and a tenth cluster 830 for index number 0.

The squares indicate outliers, the stars indicate good labels, and the diamonds indicate the wrong label. The embeddings from 10 distinct clusters result using URSVAE and correspond to true class labels instead of noisy labels. Using URSVAE results in a better separation between the 10 different classes in the presence of compound noise.

An unsupervised test log-likelihood was computed using different classifications with the permutation invariant MNIST dataset with 20% outlier observations. VAE+NF represents the normalizing flows VAE described in a paper by Miyato, T., et al., *Distributional Smoothing with Virtual Adversarial Training*, arXiv preprint arXiv:1507.00677, 2015, IWAE represents the method described in a paper by Burda, Y., et al., *Importance Weighted Autoencoders*, arXiv preprint arXiv:1509.00519, 2015, VAE+VGP represents the variational Gaussian process VAE described in a paper by Tran, D., et al., *Variational Gaussian process*, arXiv preprint arXiv:1511.06499, 2015, and LVAE represents the method described in a paper by Sønderby, C., et al., *Ladder variational autoencoders*, arXiv preprint arXiv:1602.02282, 2016. β=0.2. L represents a number of stochastic latent layers $z_1; \ldots; z_L$, and IW characterizes importance weighted samples during training. 5000 importance weighted samples with warm up, batch normalization and one Monte Carlo sample and IW sample for training was used. A lower bound for the ELBO on the unclassified data 126 is shown for various cases in Table 2 below.

TABLE 2

| Method | -log p(x) |
|---|---|
| VAE + NF, L = 1 | −89.35 |
| IWAE, L = 1, IW = 1 | −90.26 |
| IWAE, L = 1, IW = 50 | −88.36 |
| IWAE, L = 2, IW = 1 | −89.71 |
| IWAE, L = 2, IW = 50 | −86.43 |
| VAE + VGP, L = 2 | −85.79 |
| LVAE, L = 5, IW = 1 | −85.08 |
| ADGM, L = 1, IW = 1 | −84.67 |
| ADGM, L = 1, IW = 2 | −84.34 |

TABLE 2-continued

| Method | -log p(x) |
|---|---|
| URSVAE, L = 1, IW = 1 | −83.12 |
| URSVAE, L = 1, IW = 2 | −82.86 |

The results show that classification application 122 implementing URSVAE performs better than the other methods in terms of log-likelihood due to the utilization of the uncertainty prior and the robust divergence in the inference.

Table 3 below shows the accuracy generated based on training a decoder model using classification application 122 implementing URSVAE and training using seven different existing classification methods with different levels of label noise and outliers included in the CIFAR-10 (C10) and the Clothing1M datasets.

TABLE 3

| Method | C10 | Clothing1M |
|---|---|---|
| VAT | 73.6 | 59.42 |
| M-correct | 87.1 | 70.53 |
| Joint-optim | 87.6 | 71.35 |
| P-correct | 86.3 | 72.81 |
| MetaLearn | 87.9 | 73.01 |
| Dividemix | 91.3 | 73.16 |
| RGAN | 86.9 | 71.97 |
| AmbientGAN | 87.3 | 70.55 |
| URSVAE | 94.7 | 79.65 |

For the Clothing1M dataset, a neural network architecture similar to the Resnet-18 architecture, described in a paper by He, K., et al., *Deep residual learning for image recognition*, Computer Vision and Patterson Recognition, 2015, was used for the decoder and encoder models except that the uncertainty prior was added as the input and the noise transition model and the auxiliary variables were added to the encoder model by encoding a 256 by 256 red-green-blue image into 512 feature maps of size 8 by 8. Joint-optim jointly optimize the sample labels and the network parameters and represents the method described in a paper by Tanaka, D., et al., *Joint optimization framework for learning with noisy labels*, International Conference on Computer Vision and Patterson Recognition, 2018.

40% asymmetric noisy labels were included using the C10 dataset. Asymmetric noise was created to simulate real-world label noise where the corrupted label consist of labels from a most similar class with respect to the ground truth (e.g. "horse" to "deer", "truck" to "automobile", "bird" to "airplane"). The Clothing1M dataset includes real-world label noise. 10% outlier observations were included using both the C10 and the Clothing1M datasets.

The results again show that classification application 122 implementing URSVAE performs better than the other methods in the presence of asymmetric noise and real-world label noise and outlier observations. URSVAE significantly outperforms the closest existing classification method, Dividemix, by 3.8% and 5.2% respectively on CIFAR-10 and Clothing1M datasets. In contrast, the existing classification methods do not accurately address outliers and label noise simultaneously.

Referring to FIG. 9, a second classification accuracy table 900 is shown that was generated based on training a decoder model using classification application 122 implementing URSVAE and training using seven different existing classification methods with 20% outlier observations included in the WebVision and the ImageNet ILSVRC12 datasets. The WebVision dataset included 2.4 million images collected from the internet using the 1,000 concepts in ImageNet ILSVRC12. The ImageNet ILSVRC12 dataset, commonly known as "ImageNet", is an image dataset organized according to the WordNet hierarchy. Each meaningful concept in WordNet, possibly described by multiple words or word phrases, is called a "synonym set" or "synset". There are more than 100,000 synsets in WordNe with a majority of them being nouns (80,000+). The baseline methods on the first 50 classes of the Google® image subset were compared. F-correct represents the method described in a paper by Patrini, G., et al., *Making deep neural networks robust to label noise: A loss correction approach*, IEEE Conference on Computer Vision and Pattern Recognition, 2017. Decoupling represents the method described in a paper by Malach, E. and Shwartz, S., *Decoupling "when to update" from "how to update"*, Neural Information Processing Systems, 2017. Iterative-CV applies cross-validation to randomly split noisy datasets and represents the method described in a paper by Chen, P., et al., *Understanding and utilizing deep neural networks trained with noisy labels*, International Conference on Machine Learning, 2019.

For the WebVision dataset, the neural network architecture similar to the Resnet-18 architecture, described in the paper by He, K., et al., *Deep residual learning for image recognition*, Computer Vision and Patterson Recognition, 2015, was used for the decoder and encoder models except that the uncertainty prior was added as the input and the noise transition model and the auxiliary variables were added to the encoder model by encoding a 256 by 256 red-green-blue image into 512 feature maps of size 8 by 8.

Second classification accuracy table 900 compares the top-1 or top-5 accuracy. Top-5 accuracy is an extension of the top-1 accuracy where instead of computing the probability that the most probable class label is the ground truth label, the probability that the group truth label is in the top 5 most probable labels is calculated. Using the existing MentorNet classification method, an auxiliary teacher network is pre-trained and used to drop samples with noisy labels for its student network which is used for image recognition.

A first column 901 shows an accuracy for each classification method using the WebVision dataset and computing the top-1 accuracy. A second column 902 shows an accuracy for each classification method using the WebVision dataset and computing the top-5 accuracy. A third column 903 shows an accuracy for each classification method using the ILSVRC12 dataset and computing the top-1 accuracy. A fourth column 904 shows an accuracy for each classification method using the ILSVRC12 dataset and computing the top-5 accuracy. Again, classification application 122 implementing URSVAE achieves the best performance with respect to the other existing classification methods.

There are applications for classification application 122 and/or prediction application 422 in many areas such as process control and equipment health monitoring, image processing and classification, data segmentation, data analysis, etc. The presented results demonstrate improved classification accuracies in combination with improved computation times.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   identify noisy classified observation vectors from a plurality of classified observation vectors, wherein noisy classified observation vectors are determined to have an incorrect target variable value;
   correct the incorrect target variable value of the identified noisy classified observation vectors;
   (A) select a first batch of unclassified observation vectors from a plurality of unclassified observation vectors, wherein the first batch of unclassified observation vectors includes a predefined number of observation vectors;
   (B) select a first batch of classified observation vectors from the plurality of classified observation vectors after correcting the incorrect target variable value of the identified noisy classified observation vectors, wherein a target variable value is defined to represent a class for each respective observation vector of the plurality of classified observation vectors, wherein the first batch of classified observation vectors includes the predefined number of observation vectors;
   (C) compute a prior regularization error value using a β-divergence distance computation from the selected first batch of unclassified observation vectors and the selected first batch of classified observation vectors, wherein a predefined β value for the β-divergence distance computation is greater than zero and less than one;
   (D) compute a decoder reconstruction error value from the selected first batch of unclassified observation vectors and the selected first batch of classified observation vectors;
   (E) generate a first batch of noise observation vectors using a predefined noise function, wherein the first batch of noise observation vectors includes a predefined number of observation vectors;
   (F) compute an evidence lower bound (ELBO) gradient value from the computed prior regularization error value and the computed decoder reconstruction error value;
   (G) compute a gradient of an encoder neural network model;
   (H) update an ELBO value using the computed ELBO gradient value;
   (I) update a decoder neural network model with a plurality of observation vectors, wherein the plurality of observation vectors includes the first selected batch of unclassified observation vectors, the selected first batch of classified observation vectors, and the generated first batch of noise observation vectors;
(J) update the encoder neural network model with the plurality of observation vectors;
(K) train the decoder neural network model to classify the plurality of unclassified observation vectors and the first batch of noise observation vectors by repeating (A) to (J) until the computed ELBO gradient value indicates a decoder loss value and an encoder loss value have converged or a predetermined maximum number of iterations of (A) is performed;
determine the target variable value for each observation vector of the plurality of unclassified observation vectors based on an output of the trained decoder neural network model; and
output the target variable value for each observation vector of the plurality of unclassified observation vectors, wherein the target variable value selected for each observation vector of the plurality of unclassified observation vectors identifies the class of a respective observation vector,
wherein identifying the noisy classified observation vectors and correcting the incorrect target variable value comprises:
defining cluster centers for the plurality of unclassified observation vectors using a clustering algorithm, wherein a number of the cluster centers is a number of unique values of the target variable value of the plurality of classified observation vectors;
defining class centers for the plurality of classified observation vectors using the clustering algorithm, wherein a number of the class centers is the number of unique values of the target variable value;
determining a unique class for each cluster of the defined cluster centers, wherein the unique class is selected from a plurality of classes, wherein each class of the plurality of classes represents a unique value of the target variable value of the plurality of classified observation vectors;
(L) selecting a next classified observation vector from the plurality of classified observation vectors;
(M) computing a distance value between the selected next classified observation vector and each cluster center of the defined cluster centers;
(N) when the target variable value of the selected next classified observation vector is not the unique class determined for a cluster center having a minimum computed distance value,
selecting a first distance value as the minimum computed distance value;
selecting a second distance value as the computed distance value to the cluster center having the unique class of the target variable value of the selected next classified observation vector;
computing a ratio value between the selected second distance value and the selected first distance value; and
changing the target variable value of the selected next classified observation vector to the unique class determined for the cluster center having the minimum computed distance value when the computed ratio value satisfies a predefined label correction threshold; and
(O) repeating (L) through (N) until each observation vector of the plurality of classified observation vectors is selected in (L),
wherein the target variable value selected for each observation vector of the plurality of observation vectors is defined to represent the class for a respective observation vector.

2. The non-transitory computer-readable medium of claim 1, wherein the clustering algorithm is a k-means clustering algorithm.

3. The non-transitory computer-readable medium of claim 1, wherein the distance value is a Euclidian distance.

4. The non-transitory computer-readable medium of claim 1, wherein the ratio value is computed using $$r_v = \frac{e^{-d_1}}{\sum_{j=1}^{2} e^{-d_j}},$$

where $r_v$ is the ratio value, $d_1$ is the selected first distance value, and $d_2$ is the selected second distance value.

5. The non-transitory computer-readable medium of claim 4, wherein the computed ratio value satisfies the predefined label correction threshold when the computed ratio value is greater than the predefined label correction threshold.

6. The non-transitory computer-readable medium of claim 1, wherein defining the cluster centers comprises:
executing the clustering algorithm to assign each observation vector of the plurality of unclassified observation vectors to a cluster of the number of the cluster centers; and
computing an average of each observation vector assigned to a common cluster to define a cluster center for the common cluster.

7. The non-transitory computer-readable medium of claim 6, wherein defining the class centers comprises:
computing an average of each observation vector of the plurality of classified observation vectors having a common unique value of the target variable value to define a class center for each unique value of the target variable value.

8. The non-transitory computer-readable medium of claim 7, wherein determining the unique class for each cluster of the defined cluster centers comprises:
computing a cluster distance value between each cluster center of the defined cluster centers and each class center of the defined class centers to define cluster distance values for each respective cluster center;
wherein the unique class determined for each cluster center of the defined cluster centers is the unique value of the target variable value associated with the class center that has a minimum value of the cluster distance value defined for each respective cluster center.

9. The non-transitory computer-readable medium of claim 8, wherein the computed cluster distance value is a Euclidian distance.

10. The non-transitory computer-readable medium of claim 1, wherein the ELBO value is computed using $L_\beta^{Dec} + L_{prior} + \lambda(U_\beta^{Dec} + U_{prior})$, where $L_{prior} + \lambda U_{prior}$ indicates the prior regularization error value, $L_\beta^{Dec} + \lambda U_\beta^{Dec}$ indicates the decoder reconstruction error value, and $\lambda$ is a predefined regularization parameter value.

11. The non-transitory computer-readable medium of claim 10, wherein the prior regularization error value is computed using $L_{prior} + \lambda U_{prior} = D_\beta[q(H|x,\tilde{y}), p(H)] + \lambda D_\beta[q(H_U|x), p(H_U)]$, where $D_\beta$ indicates a distance computation using the β-divergence with the predefined β value, $q(H|x,\tilde{y})$ indicates an approximated posterior distribution of hidden variables H given an observation vector x of the plurality of classified observation vectors and the target variable value $\tilde{y}$ of observation vector x after (O), p(H) indicates a prior probability for the hidden variables H, $q(H_U|x)$ indicates an approximated posterior distribution of second hidden variables $H_U$ given the observation vector x, and $p(H_U)$ indicates a prior probability distribution for the plurality of unclassified observation vectors.

12. The non-transitory computer-readable medium of claim 1, wherein the updated decoder neural network model is further output.

13. The non-transitory computer-readable medium of claim 1, wherein after (K), the computer-readable instructions further cause the computing device to:
   read a new observation vector from a dataset;
   input the read new observation vector to the updated decoder neural network model to predict a class for the read new observation vector; and
   output the predicted class.

14. The non-transitory computer-readable medium of claim 1, wherein the decoder reconstruction error value is computed using Monte Carlo sampling.

15. A computing device comprising:
   a processor; and
   a non-transitory computer-readable medium operably coupled to the processor, the computer-readable medium having computer-readable instructions stored thereon that, when executed by the processor, cause the computing device to
      identify noisy classified observation vectors from a plurality of classified observation vectors, wherein noisy classified observation vectors are determined to have an incorrect target variable value;
      correct the incorrect target variable value of the identified noisy classified observation vectors;
      (A) select a first batch of unclassified observation vectors from a plurality of unclassified observation vectors, wherein the first batch of unclassified observation vectors includes a predefined number of observation vectors;
      (B) select a first batch of classified observation vectors from the plurality of classified observation vectors after correcting the incorrect target variable value of the identified noisy classified observation vectors, wherein a target variable value is defined to represent a class for each respective observation vector of the plurality of classified observation vectors, wherein the first batch of classified observation vectors includes the predefined number of observation vectors;
      (C) compute a prior regularization error value using a β-divergence distance computation from the selected first batch of unclassified observation vectors and the selected first batch of classified observation vectors, wherein a predefined β value for the β-divergence distance computation is greater than zero and less than one;
      (D) compute a decoder reconstruction error value from the selected first batch of unclassified observation vectors and the selected first batch of classified observation vectors;
      (E) generate a first batch of noise observation vectors using a predefined noise function, wherein the first batch of noise observation vectors includes a predefined number of observation vectors;
      (F) compute an evidence lower bound (ELBO) gradient value from the computed prior regularization error value and the computed decoder reconstruction error value;
      (G) compute a gradient of an encoder neural network model;
      (H) update an ELBO value using the computed ELBO gradient value;
      (I) update a decoder neural network model with a plurality of observation vectors, wherein the plurality of observation vectors includes the first selected batch of unclassified observation vectors, the selected first batch of classified observation vectors, and the generated first batch of noise observation vectors;
      (J) update the encoder neural network model with the plurality of observation vectors;
      (K) train the decoder neural network model to classify the plurality of unclassified observation vectors and the first batch of noise observation vectors by repeating (A) to (J) until the computed ELBO gradient value indicates a decoder loss value and an encoder loss value have converged or a predetermined maximum number of iterations of (A) is performed;
      determine the target variable value for each observation vector of the plurality of unclassified observation vectors based on an output of the trained decoder neural network model; and
      output the target variable value for each observation vector of the plurality of unclassified observation vectors, wherein the target variable value selected for each observation vector of the plurality of unclassified observation vectors identifies the class of a respective observation vector, wherein identifying the noisy classified observation vectors and correcting the incorrect target variable value comprises:
         defining cluster centers for the plurality of unclassified observation vectors using a clustering algorithm, wherein a number of the cluster centers is a number of unique values of the target variable value of the plurality of classified observation vectors;
         defining class centers for the plurality of classified observation vectors using the clustering algorithm, wherein a number of the class centers is the number of unique values of the target variable value;
         determining a unique class for each cluster of the defined cluster centers, wherein the unique class is selected from a plurality of classes, wherein each class of the plurality of classes represents a unique value of the target variable value of the plurality of classified observation vectors;
      (L) selecting a next classified observation vector from the plurality of classified observation vectors;
      (M) computing a distance value between the selected next classified observation vector and each cluster center of the defined cluster centers;
      (N) when the target variable value of the selected next classified observation vector is not the unique class determined for a cluster center having a minimum computed distance value,
         selecting a first distance value as the minimum computed distance value;
         selecting a second distance value as the computed distance value to the cluster center having the unique class of the target variable value of the selected next classified observation vector;
computing a ratio value between the selected second distance value and the selected first distance value; and
changing the target variable value of the selected next classified observation vector to the unique class determined for the cluster center having the minimum computed distance value when the computed ratio value satisfies a predefined label correction threshold; and
(O) repeating (L) through (N) until each observation vector of the plurality of classified observation vectors is selected in (L),
wherein the target variable value selected for each observation vector of the plurality of observation vectors is defined to represent the class for a respective observation vector.

16. The computing device of claim 15, wherein the ELBO value is computed using $L_\beta^{Dec}+L_{prior}+\lambda(U_\beta^{Dec}+U_{prior})$, where $L_{prior}+\lambda U_{prior}$ indicates the prior regularization error value, $L_\beta^{Dec}+\lambda U_\beta^{Dec}$ indicates the decoder reconstruction error value, and $\lambda$ is a predefined regularization parameter value.

17. The computing device of claim 16, wherein the prior regularization error value is computed using $L_{prior}+\lambda U_{prior}=D_\beta[q(H|x,\tilde{y}),p(H)]+\lambda D_\beta[q(H_U|x),p(H_U)]$, where $D_\beta$ indicates a distance computation using the β-divergence with the predefined β value, $q(H|x,\tilde{y})$ indicates an approximated posterior distribution of hidden variables H given an observation vector x of the plurality of classified observation vectors and the target variable value $\tilde{y}$ of observation vector x after (O), p(H) indicates a prior probability for the hidden variables H, $q(H_U|x)$ indicates an approximated posterior distribution of second hidden variables $H_U$ given the observation vector x, and $p(H_U)$ indicates a prior probability distribution for the plurality of unclassified observation vectors.

18. A method of predicting occurrence of an event or classifying an object using semi-supervised data to label unclassified data, the method comprising:
identifying, by a computing device, noisy classified observation vectors from a plurality of classified observation vectors, wherein noisy classified observation vectors are determined to have an incorrect target variable value;
correcting, by the computing device, the incorrect target variable value of the identified noisy classified observation vectors;
(A) selecting, by the computing device, a first batch of unclassified observation vectors from a plurality of unclassified observation vectors, wherein the first batch of unclassified observation vectors includes a predefined number of observation vectors;
(B) selecting, by the computing device, a first batch of classified observation vectors from the plurality of classified observation vectors after correcting the incorrect target variable value of the identified noisy classified observation vectors, wherein a target variable value is defined to represent a class for each respective observation vector of the plurality of classified observation vectors, wherein the first batch of classified observation vectors includes the predefined number of observation vectors;
(C) computing, by the computing device, a prior regularization error value using a β-divergence distance computation from the selected first batch of unclassified observation vectors and the selected first batch of classified observation vectors, wherein a predefined β value for the β-divergence distance computation is greater than zero and less than one;
(D) computing, by the computing device, a decoder reconstruction error value from the selected first batch of unclassified observation vectors and the selected first batch of classified observation vectors;
(E) generating, by the computing device, a first batch of noise observation vectors using a predefined noise function, wherein the first batch of noise observation vectors includes a predefined number of observation vectors;
(F) computing, by the computing device, an evidence lower bound (ELBO) gradient value from the computed prior regularization error value and the computed decoder reconstruction error value;
(G) computing, by the computing device, a gradient of an encoder neural network model;
(H) updating, by the computing device, an ELBO value using the computed ELBO gradient value;
(I) updating, by the computing device, a decoder neural network model with a plurality of observation vectors, wherein the plurality of observation vectors includes the first selected batch of unclassified observation vectors, the selected first batch of classified observation vectors, and the generated first batch of noise observation vectors;
(J) updating, by the computing device, the encoder neural network model with the plurality of observation vectors;
(K) training, by the computing device, the decoder neural network model to classify the plurality of unclassified observation vectors and the first batch of noise observation vectors by repeating (A) to (J) until the computed ELBO gradient value indicates a decoder loss value and an encoder loss value have converged or a predetermined maximum number of iterations of (A) is performed;
determining, by the computing device, the target variable value for each observation vector of the plurality of unclassified observation vectors based on an output of the trained decoder neural network model; and
outputting, by the computing device, the target variable value for each observation vector of the plurality of unclassified observation vectors, wherein the target variable value selected for each observation vector of the plurality of unclassified observation vectors identifies the class of a respective observation vector,
wherein identifying the noisy classified observation vectors and correcting the incorrect target variable value comprises:
defining, by the computing device, cluster centers for the plurality of unclassified observation vectors using a clustering algorithm, wherein a number of the cluster centers is a number of unique values of the target variable value of the plurality of classified observation vectors;
defining, by the computing device, class centers for the plurality of classified observation vectors using the clustering algorithm, wherein a number of the class centers is the number of unique values of the target variable value;
determining, by the computing device, a unique class for each cluster of the defined cluster centers, wherein the unique class is selected from a plurality of classes, wherein each class of the plurality of classes represents a unique value of the target variable value of the plurality of classified observation vectors;

(L) selecting, by the computing device, a next classified observation vector from the plurality of classified observation vectors;

(M) computing, by the computing device, a distance value between the selected next classified observation vector and each cluster center of the defined cluster centers;

(N) when the target variable value of the selected next classified observation vector is not the unique class determined for a cluster center having a minimum computed distance value, selecting, by the computing device, a first distance value as the minimum computed distance value;

selecting, by the computing device, a second distance value as the computed distance value to the cluster center having the unique class of the target variable value of the selected next classified observation vector;

computing, by the computing device, a ratio value between the selected second distance value and the selected first distance value; and changing, by the computing device, the target variable value of the selected next classified observation vector to the unique class determined for the cluster center having the minimum computed distance value when the computed ratio value satisfies a predefined label correction threshold; and (O) repeating, by the computing device, (L) through (N) until each observation vector of the plurality of classified observation vectors is selected in (L), wherein the target variable value selected for each observation vector of the plurality of observation vectors is defined to represent the class for a respective observation vector.

19. The method of claim 18, wherein the clustering algorithm is a k-means clustering algorithm.

20. The method of claim 18, wherein the distance value is a Euclidian distance.

21. The method of claim 18, wherein the ratio value is computed using $$r_v = \frac{e^{-d_1}}{\sum_{j=1}^{2} e^{-d_j}},$$

where $r_v$ is the ratio value, $d_1$ is the selected first distance value, and $d_2$ is the selected second distance value.

22. The method of claim 21, wherein the computed ratio value satisfies the predefined label correction threshold when the computed ratio value is greater than the predefined label correction threshold.

23. The method of claim 18, wherein defining the cluster centers comprises:

executing the clustering algorithm to assign each observation vector of the plurality of unclassified observation vectors to a cluster of the number of the cluster centers; and computing an average of each observation vector assigned to a common cluster to define a cluster center for the common cluster.

24. The method of claim 23, wherein defining the class centers comprises:

computing an average of each observation vector of the plurality of classified observation vectors having a common unique value of the target variable value to define a class center for each unique value of the target variable value.

25. The method of claim 24, wherein determining the unique class for each cluster of the defined cluster centers comprises:

computing a cluster distance value between each cluster center of the defined cluster centers and each class center of the defined class centers to define cluster distance values for each respective cluster center;

wherein the unique class determined for each cluster center of the defined cluster centers is the unique value of the target variable value associated with the class center that has a minimum value of the cluster distance value defined for each respective cluster center.

26. The method of claim 25, wherein the computed cluster distance value is a Euclidian distance.

27. The method of claim 18, wherein the ELBO value is computing using $L_\beta^{Dec}+L_{prior}+\lambda(U_\beta^{Dec}+U_{prior})$, where $L_{prior}+\lambda U_{prior}$ indicates the prior regularization error value, $L_\beta^{Dec}+\lambda U_\beta^{Dec}$ indicates the decoder reconstruction error value, and $\lambda$ is a predefined regularization parameter value.

28. The method of claim 27, wherein the prior regularization error value is computed using $L_{prior}+\lambda U_{prior}=D_\beta[q(H|x,\tilde{y}),p(H)]+\lambda D_\beta[q(H_U|x),p(H_U)]$, where $D_\beta$ indicates a distance computation using the $\beta$-divergence with the predefined $\beta$ value, $q(H|x,\tilde{y})$ indicates an approximated posterior distribution of hidden variables H given an observation vector x of the plurality of classified observation vectors and the target variable value $\tilde{y}$ of observation vector x after (O), p(H) indicates a prior probability for the hidden variables H, $q(H_U|x)$ indicates an approximated posterior distribution of second hidden variables $H_U$ given the observation vector x, and $p(H_U)$ indicates a prior probability distribution for the plurality of unclassified observation vectors.

29. The method of claim 18, wherein the updated decoder neural network model is further output.

30. The method of claim 18, wherein the decoder reconstruction error value is computed using Monte Carlo sampling.

* * * * *

UNITED STATES PATENT AND TRADEMARK OFFICE
CERTIFICATE OF CORRECTION

PATENT NO. : 11,379,685 B2
APPLICATION NO. : 17/386706
DATED : July 5, 2022
INVENTOR(S) : Xu Chen Page 1 of 1

It is certified that error appears in the above-identified patent and that said Letters Patent is hereby corrected as shown below:

In the Claims

Claim 10, Column 32, Lines 57-58:
Delete the phrase "$L_\beta^{Dec} + L_{prior} + \lambda(U_\beta^{Dec} + U_{prior})$," and replace with
--$L_\beta^{Dec} + L_{prior} + \lambda(U_\beta^{Dec} + U_{prior})$,--.

Claim 10, Column 32, Line 59:
Delete the phrase "$L_\beta^{Dec} + \lambda U_\beta^{Dec}$" and replace with --$L_\beta^{Dec} + \lambda U_\beta^{Dec}$--.

Claim 16, Column 35, Line 20:
Delete the phrase "$L_\beta^{Dec} + L_{prior} + \lambda(U_\beta^{Dec} + U_{prior})$," and replace with
--$L_\beta^{Dec} + L_{prior} + \lambda(U_\beta^{Dec} + U_{prior})$,--.

Claim 16, Column 35, Line 22:
Delete the phrase "$L_\beta^{Dec} + \lambda U_\beta^{Dec}$" and replace with --$L_\beta^{Dec} + \lambda U_\beta^{Dec}$--.

Claim 27, Column 38, Line 32:
Delete the phrase "$L_\beta^{Dec} + L_{prior} + \lambda(U_\beta^{Dec} + U_{prior})$," and replace with
--$L_\beta^{Dec} + L_{prior} + \lambda(U_\beta^{Dec} + U_{prior})$,--.

Claim 27, Column 38, Line 34:
Delete the phrase "$L_\beta^{Dec} + \lambda U_\beta^{Dec}$" and replace with --$L_\beta^{Dec} + \lambda U_\beta^{Dec}$--.

Signed and Sealed this
Twenty-first Day of February, 2023

*Katherine Kelly Vidal*

Katherine Kelly Vidal
*Director of the United States Patent and Trademark Office*